(12) United States Patent
Lagumbay et al.

(10) Patent No.: US 10,630,858 B2
(45) Date of Patent: Apr. 21, 2020

(54) DOCUMENT APPROVAL MANAGEMENT SYSTEM FOR CREATING DOCUMENT APPROVAL WORKFLOW

(71) Applicant: KYOCERA Document Solutions Inc., Osaka (JP)

(72) Inventors: Rule Lymen Lagumbay, Osaka (JP); July Descartin, Osaka (JP); Dinnel Cabiles, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 0 days.

(21) Appl. No.: 16/554,780

(22) Filed: Aug. 29, 2019

(65) Prior Publication Data

US 2020/0092436 A1    Mar. 19, 2020

(30) Foreign Application Priority Data

Sep. 14, 2018    (JP) ................. 2018-172886

(51) Int. Cl.
*H04N 1/00* (2006.01)
*H04N 1/44* (2006.01)
*H04N 1/32* (2006.01)

(52) U.S. Cl.
CPC ..... *H04N 1/00949* (2013.01); *H04N 1/00222* (2013.01); *H04N 1/00244* (2013.01); *H04N 1/00331* (2013.01); *H04N 1/32149* (2013.01); *H04N 1/444* (2013.01); *H04N 2201/0094* (2013.01)

(58) Field of Classification Search
CPC ....................... H04N 1/00949; H04N 1/00222
See application file for complete search history.

(56) References Cited

U.S. PATENT DOCUMENTS

| | | | |
|---|---|---|---|
| 2009/0161158 A1* | 6/2009 | Fujikawa | H04L 51/066 358/1.15 |
| 2010/0065624 A1* | 3/2010 | Taniguchi | G06Q 10/10 235/376 |

FOREIGN PATENT DOCUMENTS

JP    2005-202931 A    7/2005

* cited by examiner

*Primary Examiner* — Ibrahim Siddo
(74) *Attorney, Agent, or Firm* — IP Business Solutions, LLC

(57) ABSTRACT

A document approval management system includes an image forming apparatus, a document management server, and a mail server, connected via a network. The image forming apparatus includes an image acquisition device, a character recognizer, a workflow information acquirer that acquires workflow information from character information recognized, a coded image creator that creates a coded image including the workflow information, a generator that generates an image with coded image, a workflow creator that creates a workflow of the image with coded image, an output device that outputs the image with coded image of the workflow to the document management server, an e-mail transmission device that transmits an e-mail accompanied with the coded image to an approver, an image forming device that forms the image with coded image on a recording sheet, and a signed image acquirer that acquires a signed image, when an approval receiver receives the approval.

8 Claims, 20 Drawing Sheets

Fig.17A
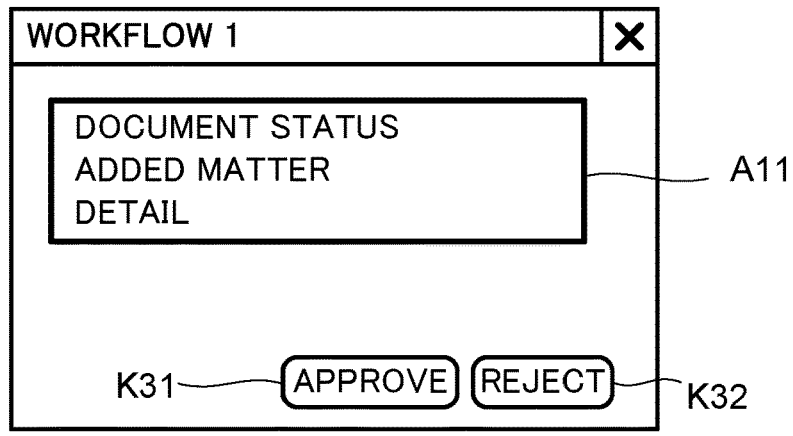
Fig.17B
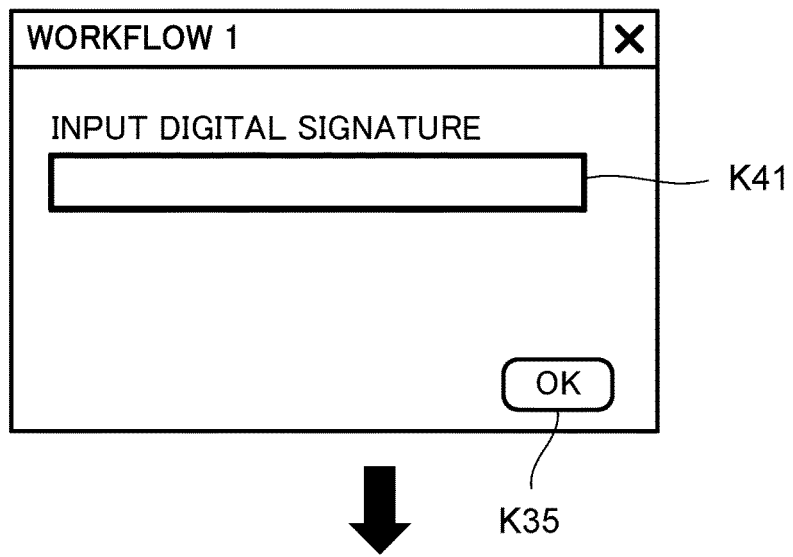
Fig.17C
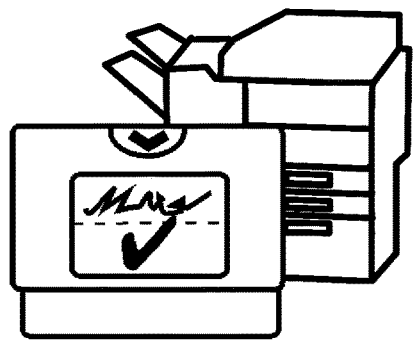

DOCUMENT APPROVAL MANAGEMENT SYSTEM FOR CREATING DOCUMENT APPROVAL WORKFLOW

INCORPORATION BY REFERENCE

This application claims priority to Japanese Patent Application No. 2018-172886 filed on Sep. 14, 2018, the entire contents of which are incorporated by reference herein.

BACKGROUND

The present disclosure relates to a document approval management system, and in particular to a technique to create a workflow for automatizing a document approval process.

In an existing information processing apparatus management system, when an information management computer receives an operation request with respect to a target computer (e.g., creation or deletion of a folder or a file in the target computer, addition of an account, and shutting down) from an individual terminal, the information management computer requests an approver computer for approval or rejection of the operation request. When the approval is confirmed, the information management computer instructs the target computer to execute the operation requested by the individual terminal, thus realizing the operation request, and stores the operation request made by the individual terminal, the approval result of the operation request, and the execution result of the operation request in a database in a form of an operation result report, to thereby manage the target computer.

SUMMARY

The disclosure proposes further improvements of the foregoing technique.

In an aspect, the disclosure provides a document approval management system including an image forming apparatus, a document management server, and a mail server connected to each other via a network. The image forming apparatus includes an operation device, an image acquisition device, a control device, an output device, an e-mail transmission device, an authentication information storage device, and an image forming device. The image acquisition device acquires an image of a document for which an applicant requests for approval to an approver, when the operation device receives an instruction to create a workflow from the applicant. The control device includes a processor, and acts as a character recognizer, a workflow information acquirer, a coded image creator, a generator, a workflow creator, an authenticator, a reading controller, an approval receiver, and a signed image acquirer, when the processor executes a document management control program. The character recognizer recognizes a character in a predetermined region included in the image acquired by the image acquisition device. The workflow information acquirer acquires workflow information including an e-mail address of the approver, from the character information recognized by the character recognizer. The coded image creator creates a coded image by encoding the workflow information acquired by the workflow information acquirer, and image identification information for identifying the image acquired by the image acquisition device. The generator generates an image with coded image, by adding the coded image created by the coded image creator to the image acquired by the image acquisition device. The workflow creator creates a workflow by associating the image with coded image generated by the generator with the workflow information acquired by the workflow information acquirer. The output device outputs the image with coded image of the workflow created by the workflow creator, to the document management server. The e-mail transmission device transmits an e-mail accompanied with the coded image to the mail server, indicating the e-mail address of the approver including in the workflow information as destination. The authentication information storage device contains authentication information stored in advance. The authenticator decides whether information inputted by the approver through the operation device upon receipt of the e-mail accords with the authentication information stored in advance in the authentication information storage device, and decides that the approver is logging in, upon confirming the accordance. The reading controller retrieves the image with coded image stored in the document management server, when the coded image attached to the e-mail is read, or upon receipt of an instruction to print the image with coded image after the authenticator decides that the approver is logging in. The image forming device forms an image representing the image with coded image retrieved by the reading controller, on a recording sheet. The approval receiver receives a decision of approval or rejection with respect to a content of the recording sheet on which the image with coded image has been formed by the image forming device, when the authenticator decides that the approver has logged in. The signed image acquirer acquires a signed image, created by the approver by putting a signature on the recording sheet on which the image with coded image has been formed by the image forming device, when the approval receiver receives the decision of approval. The output device outputs the signed image acquired by the signed image acquirer, to the document management server.

BRIEF DESCRIPTION OF THE DRAWINGS

FIG. 10B is a schematic drawing showing a selection screen for printing a coded image or logging in;

FIG. 17A is a schematic drawing showing a screen for selecting whether to approve, displayed on the display device of the image forming apparatus;

FIG. 17B is a schematic drawing showing a location where the approver inputs the digital signature for the recording sheet;

FIG. 17C is a schematic drawing showing the recording sheet with the manual signature, being scanned;

DETAILED DESCRIPTION

Hereafter, an image forming apparatus according to a first embodiment of the disclosure will be described in detail, with reference to the drawings.

Figure 1:
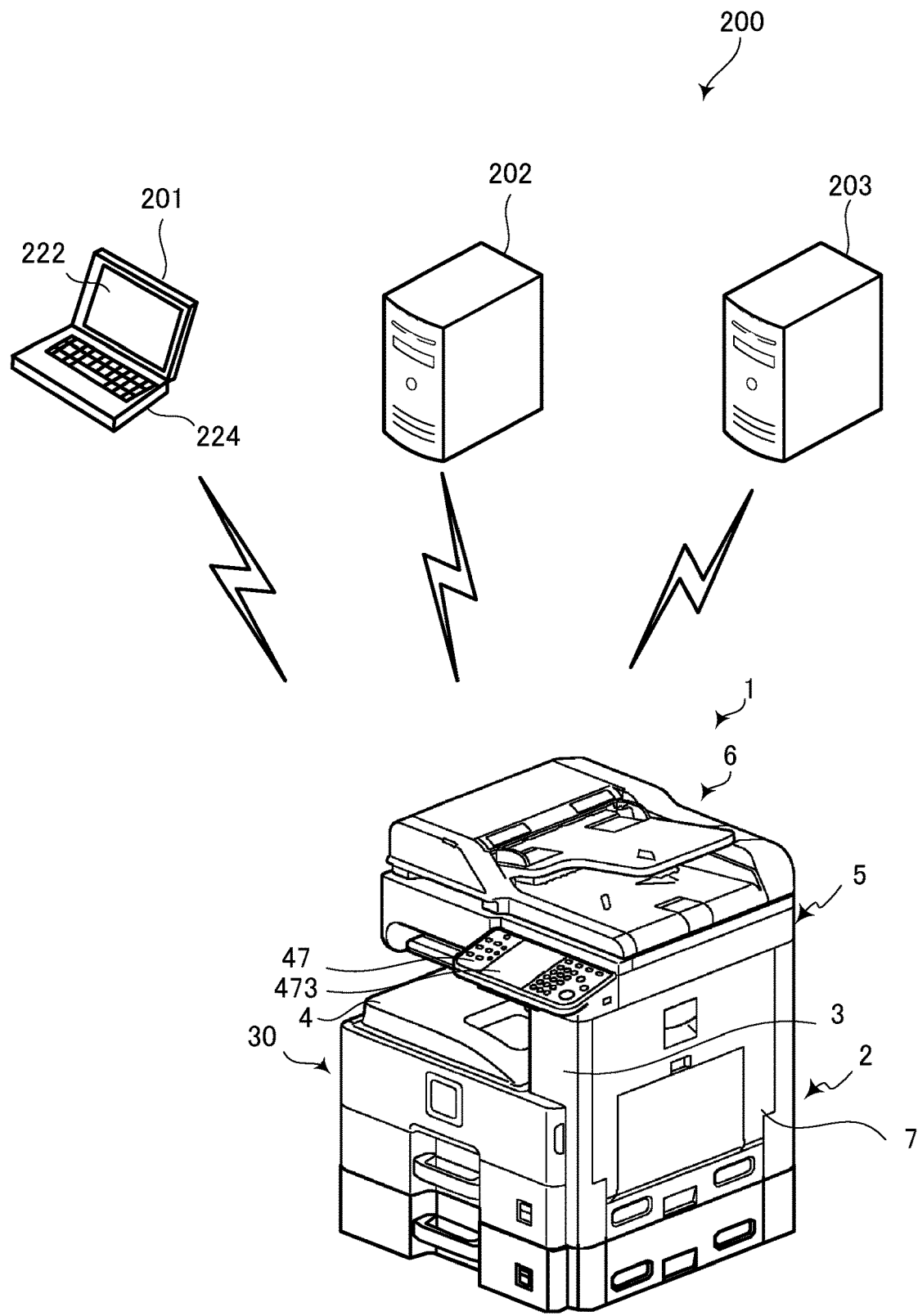
FIG. 1 is a schematic perspective view showing a document approval management system according to a first embodiment of the disclosure.

FIG. 1 is a schematic perspective view showing the appearance of a document approval management system according to the first embodiment of the disclosure. The document approval management system 200 according to the first embodiment includes an image forming apparatus 1, a document management server 202, and a mail server 203, connected to each other via a network. A terminal device 201 of an approver is connected to the image forming apparatus 1, via the network.

The document management server 202 is configured to create a digital workflow for automatizing the management of a document.

The mail server 203 is configured to manage e-mails received by the user in the network, and transmit e-mails sent by the user, to another network.

The terminal device 201 may be exemplified by a laptop computer, a tablet computer, and a desktop computer, and includes a display device 222, a communication device 224, and a non-illustrated control device. These components are configured to transmit and receive data and signals to and from each other, via a bus. For example, a communication application for transmitting and receiving e-mails to and from the image forming apparatus 1 is installed in the terminal device 201.

The display device 222 includes, for example, a liquid crystal display (LCD) or an organic light-emitting diode (OLED).

The communication device 224 is a communication interface including a communication module such as a non-illustrated LAN chip. The communication device 224 is configured to communicate with the image forming apparatus 1.

The image forming apparatus 1 will be described hereunder, with reference to the drawings. The image forming apparatus 1 is a multifunction peripheral having a plurality of functions such as a copying function, a printing function, a scanning function, and a facsimile function.

As shown in FIG. 1, the image forming apparatus 1 includes a main body 2, an image reading device 5 provided on the upper side of the main body 2, and an intermediate portion 3 provided between the image reading device 5 and the main body 2.

A plurality of components for realizing various functions of the image forming apparatus 1 are provided inside a casing 7 constituting the outer shell of the image forming apparatus 1. For example, an image reading device 5, an image forming device 12 (see FIG. 2), a fixing device 13 (see FIG. 2), and a paper feed device 30 are provided inside the casing 7.

The image reading device 5 is an automatic document feeder (ADF) including a document transport device 6 and a scanner that optically reads the document transported by the document transport device 6, or placed on a non-illustrated contact glass. When the image forming apparatus 1 reads an image, the image reading device 5 reads the documents transported by the document transport device 6 or placed on the contact glass one by one, thus to acquire the image of the document.

The image forming device 12 includes a photoconductor drum, a charging device, an exposure device, a developing device, and a transfer device, to form (print) an image on a recording sheet delivered from the paper feed device 30, on the basis of an image read by the image reading device 5, or print data provided by a plurality of terminal devices 201, a document management server 202, a mail server 203, or another facsimile machine, which are connected via a network. The recording sheet with the image formed thereon undergoes a fixing process by the fixing device 13, and is discharged to an output tray 4.

An operation device 47 is a device to be operated by the user. The operation device 47 includes, for example, a start key for instructing the image forming apparatus 1 to execute a predetermined function, an enter key for confirming the operation of the user, and numeric keys for inputting numerals.

The operation device 47 also includes a display device 473 that displays, for example, an operation guide for the user. The display device 473 is constituted of a touch panel, so that the user can operate the image forming apparatus 1 by touching an image or an icon displayed on the display device 473.

Figure 2:
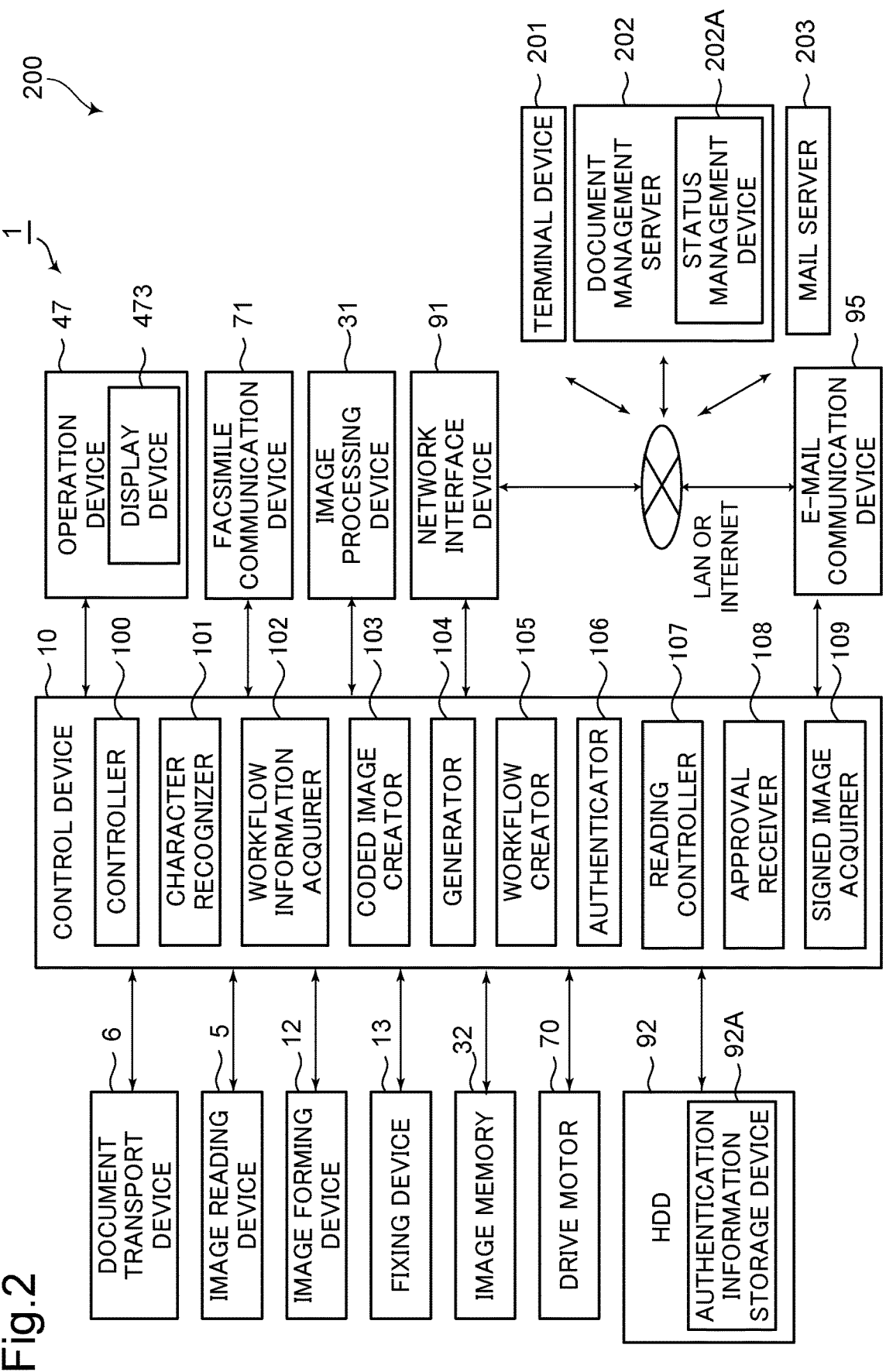
FIG. 2 is a functional block diagram showing an essential internal configuration of an image forming apparatus and a document management server, constituting the document approval management system according to the first embodiment of the disclosure.

Hereunder, a configuration of the image forming apparatus 1 will be described. FIG. 2 is a block diagram showing an essential internal configuration of the image forming apparatus according to the first embodiment.

The image forming apparatus 1 includes a control device 10. The control device 10 includes a processor, a random-access memory (RAM), a read-only memory (ROM), and so forth. The processor is, for example, a central processing unit (CPU), a micro-processing unit (MPU), or an application specific integrated circuit (ASIC).

The image reading device 5 includes a reading mechanism having a light emitter and a CCD sensor, which are under control of the control device 10. The image reading device 5 is configured to read an image from the source document by irradiating the source document with the light emitter and receiving the reflected light with the CCD sensor.

An image processing device 31 processes the image read by the image reading device 5, if need be. For example, the image processing device 31 executes predetermined image processings such as shading correction, to improve the image quality, after the image forming device 12 forms an image on the basis of the image read by the image reading device 5.

An image memory 32 is a region for temporarily storing the source image acquired through the reading operation of the image reading device 5, and an image to be printed by the image forming device 12.

The image forming device 12 forms an image based on the document image read by the image reading device 5, or print data received from the terminal device 201 connected to the network.

The fixing device 13 heats the recording sheet, on which the image (toner image) has been formed by the image forming device 12, thereby fixing the toner image onto the recording sheet by thermal compression.

The operation device 47 receives the instruction from the user, with respect to operations and processings that the image forming apparatus 1 is configured to perform. The operation device 47 includes the display device 473 that displays, for example, an operation guide for the user.

A facsimile communication device 71 includes a codec, a modem, and a network control unit (NCU), which are not shown, to transmit and receive a facsimile through the public telephone network.

A network interface device 91 includes a communication module such as a LAN board, and transmits and receives data to and from the terminal device 201, through the LAN connected to the network interface device 91.

An e-mail communication device 95 transmits e-mails to the terminal device 201 of the approver, for example through a LAN connected to the e-mail communication device 95.

A hard disk drive (HDD) 92 is a large-capacity storage device for storing various data and programs, document images read by the image reading device 5, and so forth. The HDD 92 also includes an authentication information storage device 92A, for storing in advance the authentication information of users (e.g., applicants and approvers).

A drive motor 70 serves as a drive source that provides a rotative force to rotary components in the image forming device 12 and the fixing device 13, and transport rollers.

The control device 10 includes a controller 100, a character recognizer 101, a workflow information acquirer 102, a coded image creator 103, a generator 104, a workflow creator 105, an authenticator 106, a reading controller 107, an approval receiver 108, and a signed image acquirer 109.

The control device 10 acts as the controller 100, the character recognizer 101, the workflow information acquirer 102, the coded image creator 103, the generator 104, the workflow creator 105, the authenticator 106, the reading controller 107, the approval receiver 108, and the signed image acquirer 109, when the processor executes a document management control program stored in the HDD 92. Here, the above-cited components of the control device 10 may each be constituted in the form of a hardware circuit, instead of being performed according to the program.

The controller 100 serves to control the overall operation of the image forming apparatus 1. The controller 100 is connected to the image reading device 5, the document transport device 6, the image processing device 31, the image memory 32, the image forming device 12, the fixing device 13, the operation device 47, the display device 473, the facsimile communication device 71, the network interface device 91, the e-mail communication device 95, and the HDD 92, and controls the operation of the mentioned components.

The image reading device 5 acquires the image of a document for which the applicant is requesting for approval to the approver, when an instruction to create a workflow (S13 in FIG. 3 to be subsequently referred to) is received from the applicant. For example, the image reading device 5 reads the documents transported by the document transport device 6 (document set by the applicant) or placed (by the applicant) on the non-illustrated contact glass one by one, thus to acquire the image of the document for which the approval by the approver is requested by the applicant. Here, the image reading device 5 exemplifies the image acquisition device in the disclosure.

The character recognizer 101 recognize the characters in a predetermined region in the image acquired by the image reading device 5. For example, the character recognizer 101 acquires text characters (text data) that accord with those in the predetermined region in the image acquired by the image reading device 5, through a known OCR process, thereby recognizing the characters in the predetermined region in the image acquired by the image reading device 5.

The workflow information acquirer 102 acquires workflow information out of the character information recognized by the character recognizer 101. The workflow information includes, for example, the approver (i.e., name of the approver), the title of the document, the e-mail address of the approver, and a type of the signature of the approver. The types of the signature of the approver include a manual signature manually written by the approver, a digital signature established when the approver inputs signature data (e.g., password), and the both thereof.

The coded image creator 103 creates a coded image (e.g., QR code (registered trademark)) by encoding the workflow information acquired by the workflow information acquirer 102, and image identification information for identifying the image acquired by the image reading device 5. In this embodiment, the coded image is a text QR code (registered trademark) of the JSON format, by which the coded image can be properly generated, even when the size of the workflow information and the content of the document are large. However, the coded image may be based on a format other than the JSON format, or a two-dimensional code other than the QR code (registered trademark).

The generator 104 generates an image with coded image, by adding the coded image created by the coded image creator 103 to the image acquired by the image reading device 5. For example, the generator 104 locates the coded image at a predetermined position (e.g., lower left) on the image acquired by the image reading device 5.

The workflow creator 105 creates a workflow, by associating the image with coded image generated by the generator 104 with the workflow information acquired by the workflow information acquirer 102.

The network interface device 91 outputs the image with coded image of the workflow created by the workflow creator 105, to the document management server 202. Here, the network interface device 91 exemplifies the output device in the disclosure.

The e-mail communication device 95 transmits the e-mail accompanied with the coded image to the mail server 203, indicating the e-mail address of the approver included in the workflow information as the destination. Here, the e-mail communication device 95 exemplifies the e-mail transmission device in the disclosure.

The authentication information storage device 92A contains the authentication information of the users (e.g., applicants and approvers), stored in advance. In this embodiment, user names N001, N002, N003, and N004 representing authorized users, passwords ABC, DEF, GHI, and JKL, and the mail addresses (e.g., aaa@aaa.com, bbb@bbb.com, ccc@ccc.com, and ddd@ddd.com), are stored in the authentication information storage device 92A, associated with each other on a one-to-one basis.

The authenticator 106 decides whether the information inputted by the approver through the operation device 47 upon receipt of the e-mail accords with the authentication information of the approver stored in advance in the authentication information storage device 92A, and decides that the approver is logging in, when the accordance is confirmed.

The reading controller 107 retrieves the image with coded image stored in the document management server 202, when the coded image attached to the received e-mail is read, or upon receipt of an instruction to print the image with coded image, after the authenticator 106 decides that the approver has logged in.

The image forming device 12 forms an image representing the image with coded image retrieved by the reading controller 107, on a recording sheet.

The approval receiver 108 receives the decision of approval or rejection with respect to the content of the recording sheet on which the image with coded image has been formed by the image forming device 12, when the authenticator 106 decides that the approver has logged in.

The signed image acquirer 109 acquires a signed image, which is the image of the recording sheet on which the image with coded image has been formed by the image forming device 12, and signed by the approver, when the approval receiver 108 receives the decision of approval.

The network interface device 91 outputs the signed image acquired by the signed image acquirer 109, to the document management server 202.

The e-mail communication device 95 transmits, when the approval receiver 108 receives the decision of approval or rejection, an e-mail notifying the approval or rejection to the mail server 203, indicating the e-mail address of the applicant stored in the authentication information storage device 92A as the destination.

Hereunder, the logging in of the applicant will be described. The authenticator 106 decides whether the information inputted by the applicant through the operation device 47 accords with the authentication information stored in advance in the authentication information storage device 92A, and decides that the applicant is logging in, when the accordance is confirmed.

The workflow creator 105 creates the workflow by associating the image with coded image generated by the generator 104 with the workflow information acquired by the workflow information acquirer 102, when the authenticator 106 decides that the applicant has logged in, and when the instruction to create the workflow is received from the applicant.

Thus, the workflow with respect to the image with coded image is created, when the authorized applicant has logged in, and when the instruction to create the workflow is received from the applicant. Therefore, the security related to the creation of the workflow by the applicant can be improved.

The document management server 202 includes a status management device 202A that manages the status of the document, as shown in FIG. 2.

The status management device 202A updates the status of the document relevant to the image with coded image to "under examination", when the image with coded image stored in the document management server 202 is printed on the recording sheet by the image forming device 12, updates the status of the document to "approved" when the approval receiver 108 receives the decision of approval, and updates the status of the document to "rejected", when the approval receiver 108 receives the decision of rejection. Since the status of the document is this updated to "under examination", "approved", and "rejected", the latest status of the document can be recognized. In other words, the progress of the workflow can be recognized.

(1) When the coded image indicates the manual signature as the signature type of the approver, the signed image acquirer 109 acquires, as the signed image, the image acquired by the image reading device 5 (i.e., image of the signed recording sheet, on which the image with coded image has been formed, and on which the approver has manually signed).

(2) When the coded image indicates the digital signature as the signature type of the approver, the signed image acquirer 109 acquires, as the signed image, the image with coded image to which the information representing the digital signature has been added, when the signature data (e.g., password) inputted by the approver through the operation device 47 accords with the legitimate signature data (e.g., password) stored in advance in the authentication information storage device 92A.

(3) When the coded image indicates both of the manual signature and the digital signature as the signature type of the approver, the signed image acquirer 109 acquires, as the signed image, the image acquired by the image reading device 5 (i.e., image of the signed recording sheet, on which the image with coded image has been formed, and on which the approver has manually signed), to which the information representing the digital signature has been added, when the signature data (e.g., password) inputted by the approver through the operation device 47 accords with the legitimate signature data (e.g., password) stored in advance in the authentication information storage device 92A.

The foregoing arrangement allows the applicant to designate the signature type to the approver, to thereby build a security structure linked with the post of the approver. In addition, the applicant can designate the signature type to the approver, depending on the content, type, and importance of the document to be approved, which leads to improved security level.

Referring now to flowcharts shown in FIG. 3 to FIG. 5, a document approval management process performed by the document approval management system 200 according to the first embodiment will be described hereunder.

Figure 7A:
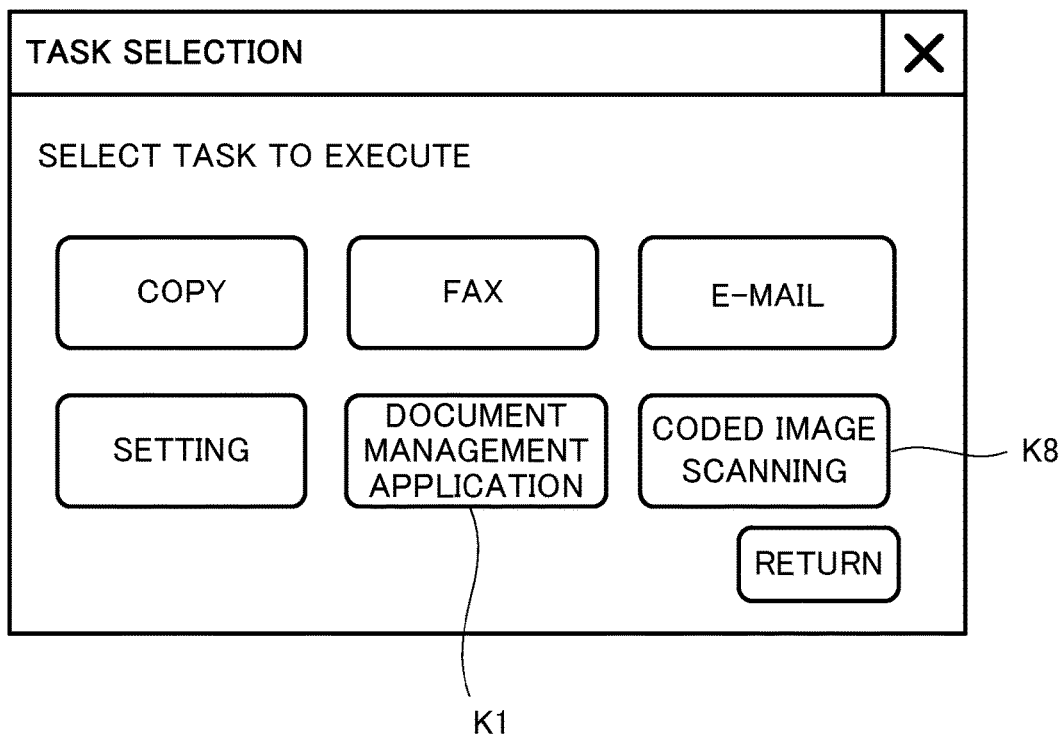
FIG. 7A is a schematic drawing showing a function selection screen, displayed on a display device of the image forming apparatus.

First, the applicant touches a select button K1 representing "document management application" displayed on the display device 473 as shown in FIG. 7A. When the touch panel of the display device 473 is touched, a detection signal indicating that the select button K1 corresponding to the document management application has been touched is outputted to the controller 100, and the controller 100 activates the document management application according to the detection signal (S11 in FIG. 3). Then the controller 100 causes the display device 473 to display an authentication information input screen shown in FIG. 7B.

Figure 7B:
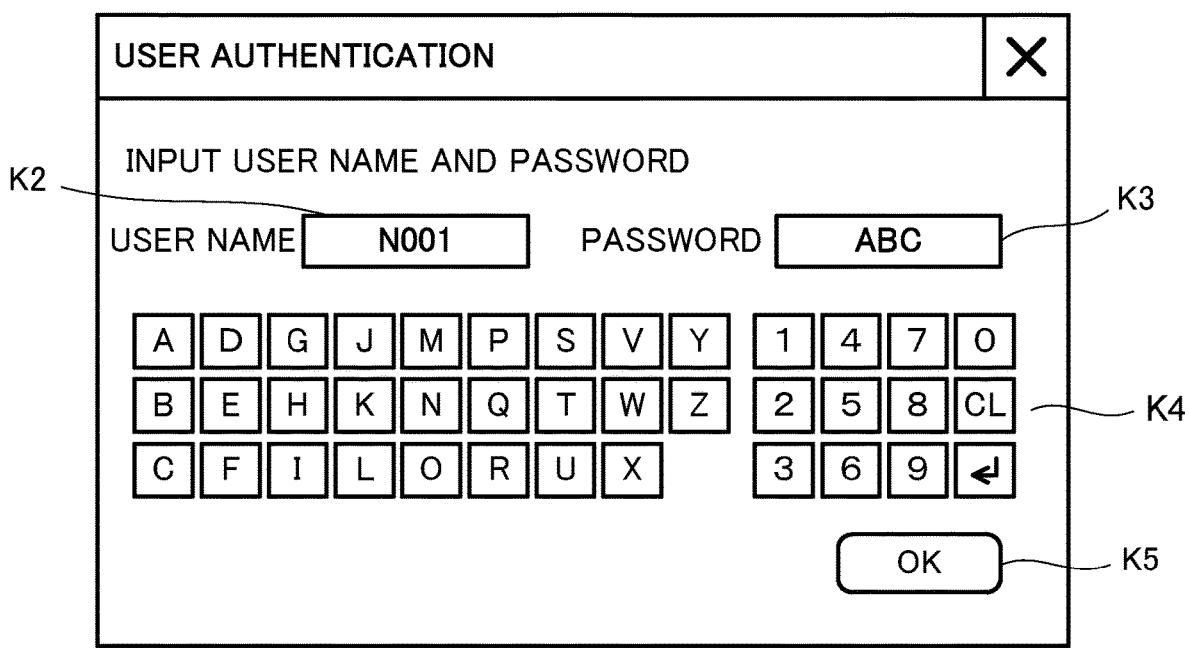
FIG. 7B is a schematic drawing showing an authentication information input screen, displayed on the display device of the image forming apparatus.

The applicant selects a user name field K2 in the authentication information input screen displayed on the display device 473 as shown in FIG. 7B, and inputs the user name through a key pad K4 of alphabets and numerals. The applicant then selects a password field K3, and inputs a password through the key pad K4 of alphabets and numerals. Then the applicant touches an OK button K5. By the touch panel function of the display device 473, the information inputted through the user name field K2 and the password field K3, and a detection signal indicating that the OK button K5 has been touched, are outputted to the controller 100, and the controller 100 outputs the information inputted through the user name field K2 and the password field K3 to the authenticator 106, according to the detection signal.

The authenticator 106 receives the user name and the password, inputted by the applicant through the display device 473 of the operation device 47 (S12). The authenticator 106 decides whether the information inputted by the applicant through the display device 473 of the operation device 47 accords with the authentication information of the user stored in advance in the authentication information storage device 92A, and decides that the authorized applicant is logging in, when the accordance is confirmed (YES at S12, see arrow Y1 in FIG. 6). When the accordance is not confirmed (NO at S12), the operation returns to S12. In the case where the accordance is not confirmed after the information is inputted more than a predetermined number of times, the controller 100 may finish the process.

Figure 8A:
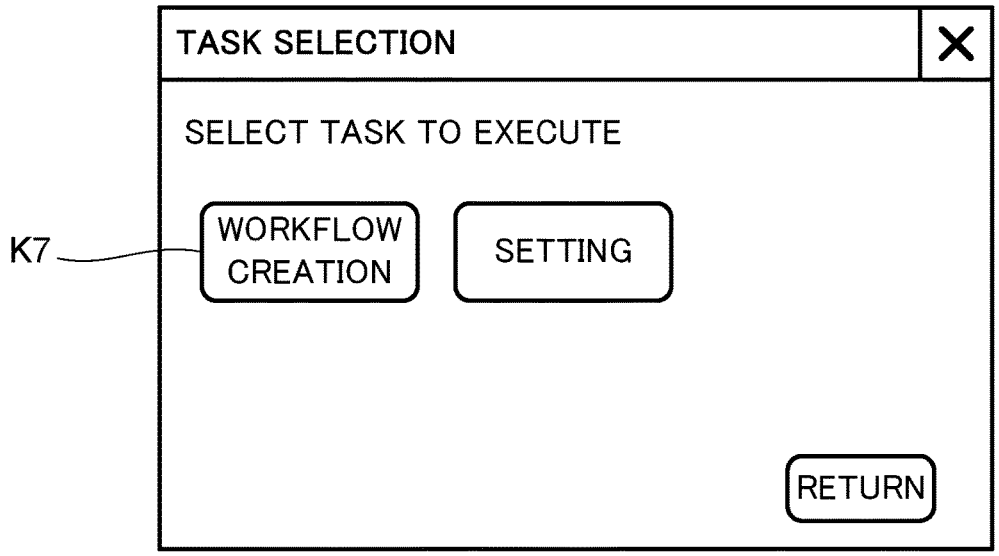
FIG. 8A is a schematic drawing showing a selection screen for creating a workflow, displayed on a display device of the image forming apparatus.

When it is decided that the authorized applicant has logged in (YES at S12), the controller 100 causes the display device 473 to display a selection screen for creating the workflow (see FIG. 8A).

The applicant touches a select button K7 representing "workflow creation" displayed on the display device 473 as shown in FIG. 8A. By the touch panel function of the display device 473, a detection signal indicating that the select button K7 corresponding to the workflow creation has been touched is outputted to the controller 100, and the controller 100 receives the instruction to create the workflow, according to the detection signal (YES at S13 in FIG. 3). In the case where the select button K7 for the workflow creation shown in FIG. 8A is not touched (NO at S13), the controller 100 finishes the process.

Figure 6:
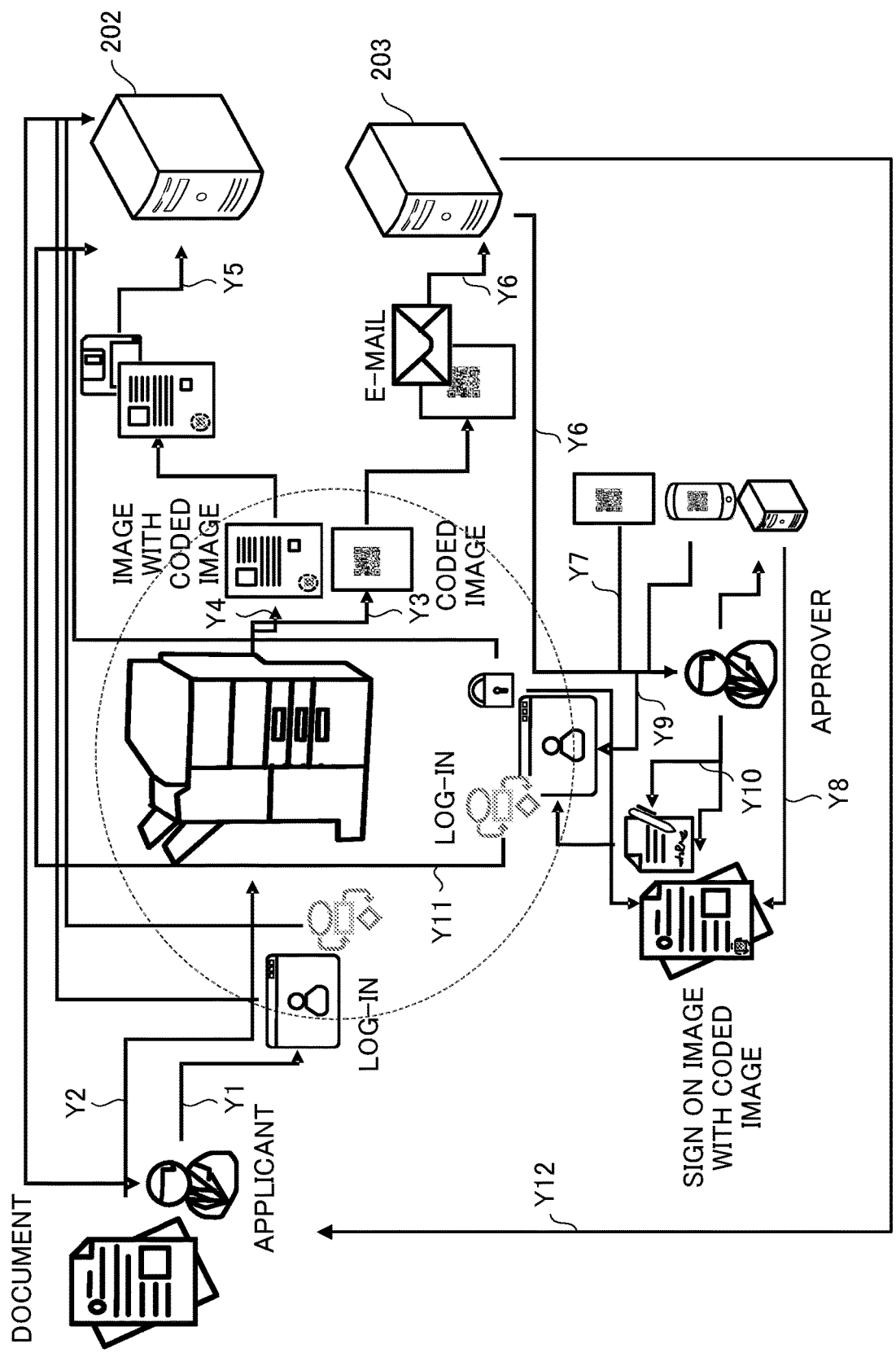
FIG. 6 is a schematic diagram for explaining a process performed by the document approval management system according to the first embodiment.

The image reading device 5 acquires the image of the document for which the applicant is requesting for approval to the approver, by scanning the document under the control of the controller 100 (S14, see arrow Y2 in FIG. 6). Thus, the image reading device 5 acquires the image of the document for which the applicant is requesting for approval to the approver, when the instruction to create the workflow (S13 in FIG. 3) is received from the applicant.

The character recognizer 101 recognizes the characters in a predetermined region in the image acquired by the image reading device 5 (S15). The predetermined region can be defined in advance, as shown in FIG. 9A and FIG. 9B.

Figure 9A:
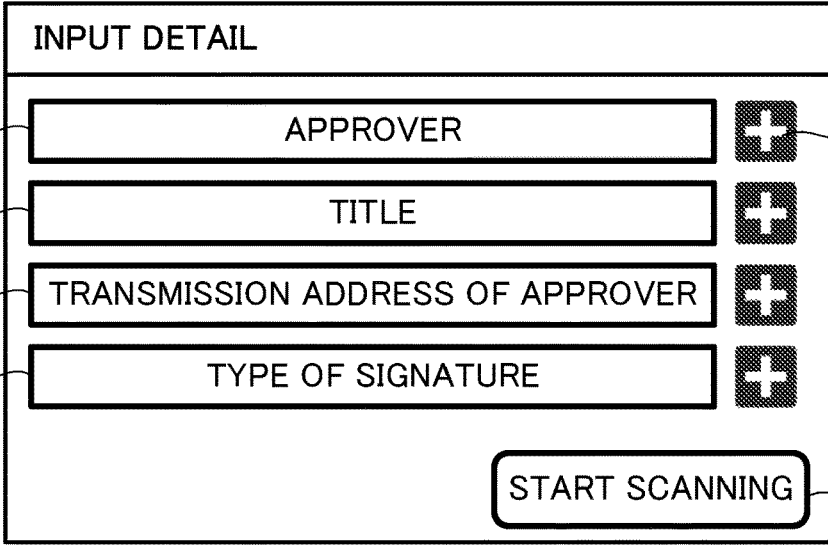
FIG. 9A is a schematic drawing showing a screen for inputting workflow information.
Figure 9B:
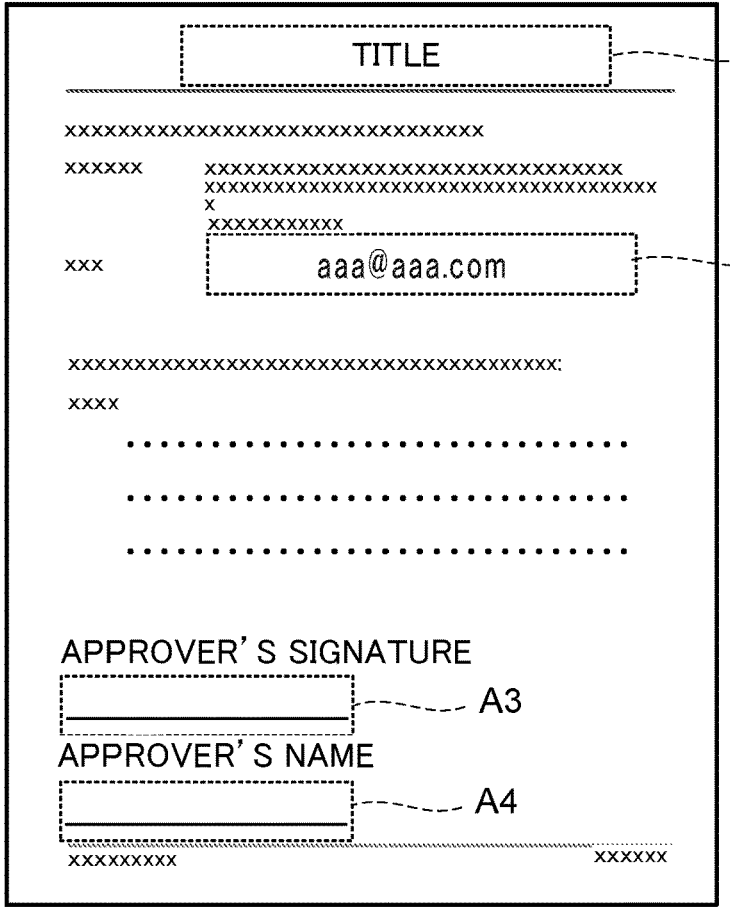
FIG. 9B is a schematic drawing showing a character recognition region, in a scanned image of a document for which approval is requested.

More specifically, when the image reading device 5 acquires the image of the document to be approved, the controller 100 causes the display device 473 to display a screen for setting the workflow information shown in FIG. 9A. The applicant touches a setting field K11 for filling in the region of the approver. By the touch panel function of the display device 473, a detection signal indicating that the setting field K11 has been touched is outputted to the controller 100, and the controller 100 causes the display device 473 to display the image of the first page of the scanned image of the document to be approved, as shown in FIG. 9B, according to the detection signal. The applicant touches a region A4 including a field for the approver's name, and the controller 100 designates the region A4 in the image of the first page of the scanned image, as the character recognition region to be recognized by the character recognizer 101. When there is an additional approver, the applicant touches an addition button K15, so that the controller 100 accepts the addition of the region A4, including an additional field for the approver's name.

Likewise, when a setting field K12 for filling in the region of the title shown in FIG. 9A is touched, the controller 100 designates a region A1 including the title (see FIG. 9B), as the character recognition region to be recognized by the character recognizer 101. When a setting field K13 for filling in the region of the transmission address of the approver shown in FIG. 9A is touched, the controller 100 designates a region A2 including the transmission address of the approver (see FIG. 9B), as the character recognition region to be recognized by the character recognizer 101. Further, when a setting field K14 for filling in the region of the signature type shown in FIG. 9A is touched, and the manual signature only is selected, or both of the manual signature and the digital signature are selected, the controller 100 designates a region A3 including the signature field (see FIG. 9B), as the character recognition region to be recognized by the character recognizer 101. When the digital signature only is selected, the controller 100 does not designate the region A3 including the signature field (see FIG. 9B), as the character recognition region to be recognized by the character recognizer 101.

Here, although the character recognition region for the character recognizer 101 can be defined as desired in this embodiment, a single-purpose sheet on which the character recognition region for the character recognizer 101 is defined in advance may be employed, so that the character recognizer 101 may read out information indicating the character recognition region on the single-purpose sheet stored in the HDD 92 in advance, thus to identify the character recognition region, and recognize the characters in the character recognition region (e.g., regions A1 to A4).

The workflow information acquirer 102 acquires the workflow information such as the approver (i.e., name of the approver), the title of the document, the e-mail address of the approver, and the signature type of the approver (the manual signature only, the digital signature only, or both), from the character information recognized by the character recognizer 101 (S16).

The coded image creator 103 creates the coded image (e.g., QR code (registered trademark)) by encoding the workflow information acquired by the workflow information acquirer 102, and the image identification information for identifying the image acquired by the image reading device 5 (S17, see arrow Y3 in FIG. 6). The generator 104 generates the image with coded image, by adding the coded image created by the coded image creator 103 to the image acquired by the image reading device 5 (see arrow Y4 in FIG. 6).

The workflow creator 105 creates the workflow by associating the image with coded image generated by the generator 104 with the workflow information acquired by the workflow information acquirer 102 (S18).

The network interface device 91 outputs the image with coded image of the workflow created by the workflow creator 105, to the document management server 202 (S19, see arrow Y5 in FIG. 6).

Figure 8B:
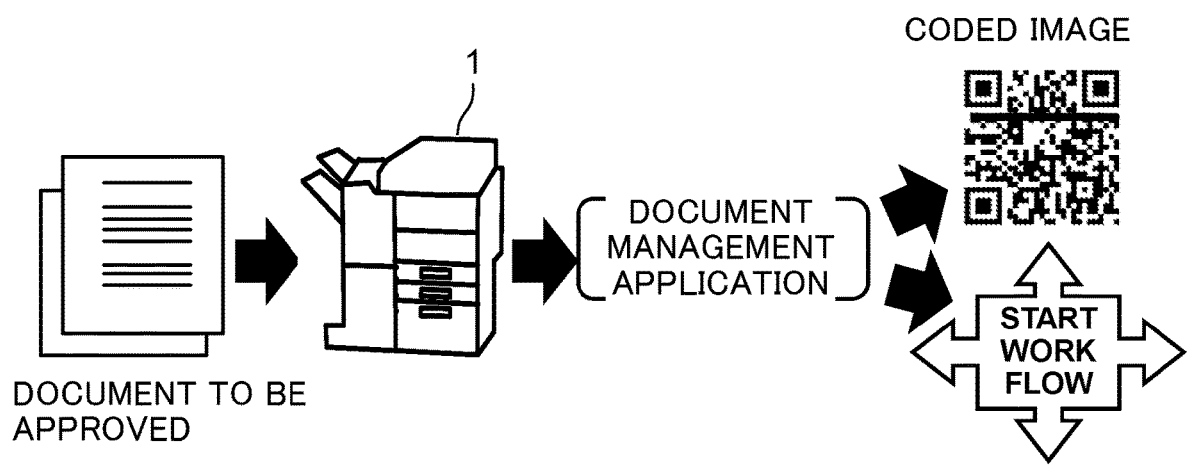
FIG. 8B is a schematic drawing showing a process of creating a workflow for an applicant to request for approval to an approver.

Through the process from S11 to S18, the image of the document can be acquired, when the applicant sets the document on the image forming apparatus 1 that has activated the document management application, and the document is scanned, as shown in FIG. 8B. Then the workflow information acquirer 102 acquires the workflow information out of the character information recognized by the character recognizer 101. The coded image creator 103 creates the coded image by encoding the workflow information acquired by the workflow information acquirer 102, and the image identification information for identifying the image acquired by the image reading device 5. The generator 104 generates the image with coded image, by adding the coded image created by the coded image creator 103 to the image acquired by the image reading device 5. The workflow creator 105 creates the workflow by associating the image with coded image generated by the generator 104 with the workflow information acquired by the workflow information acquirer 102. The workflow is thus generated, and started.

Figure 3:
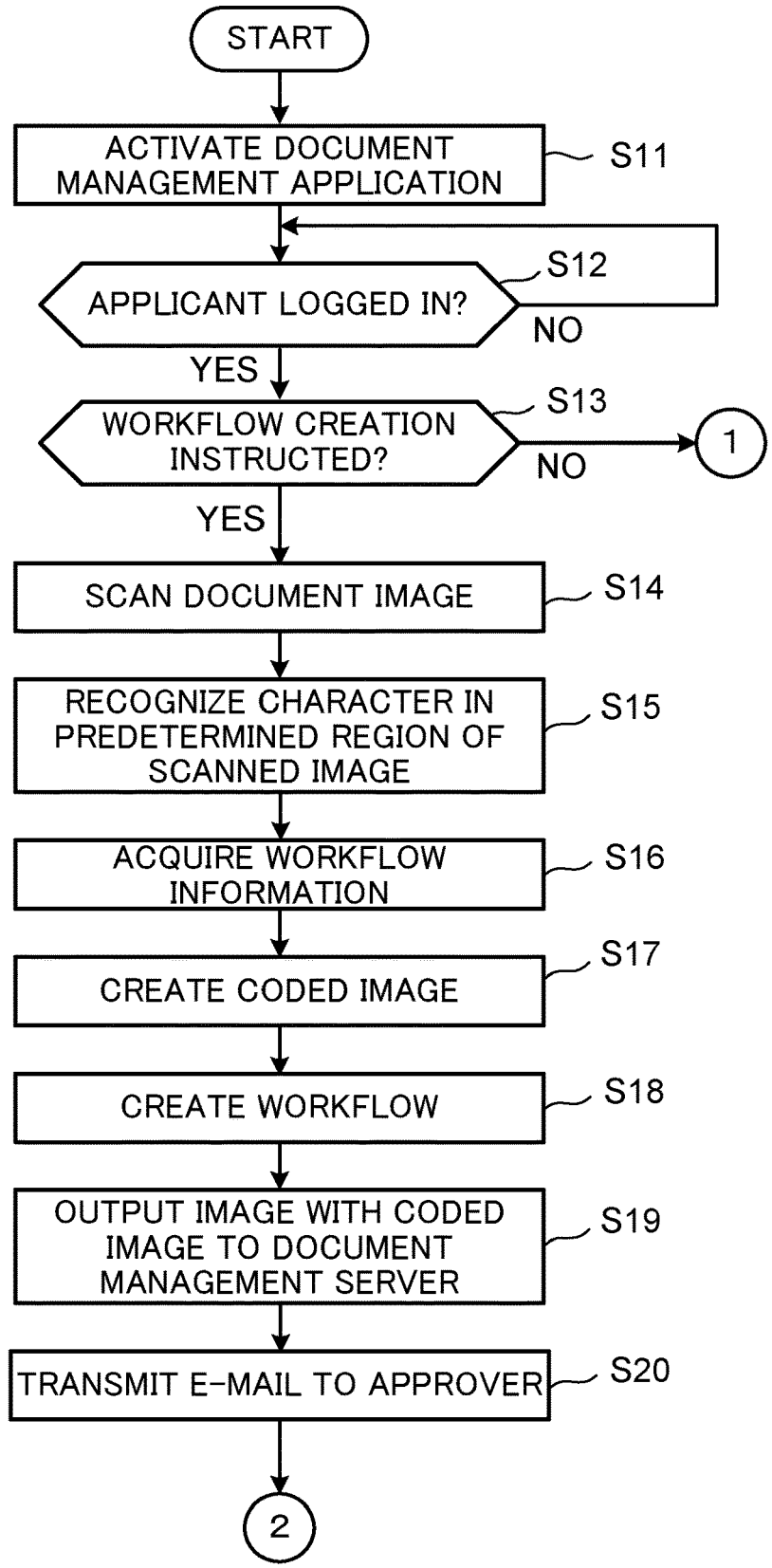
FIG. 3 is a flowchart showing a document approval management process according to the first embodiment.

After S19 in FIG. 3, the e-mail communication device 95 transmits an e-mail accompanied with the coded image to the mail server 203, indicating the e-mail address of the approver included in the workflow information as the destination (S20, see arrow Y6 in FIG. 6).

Figure 10A:
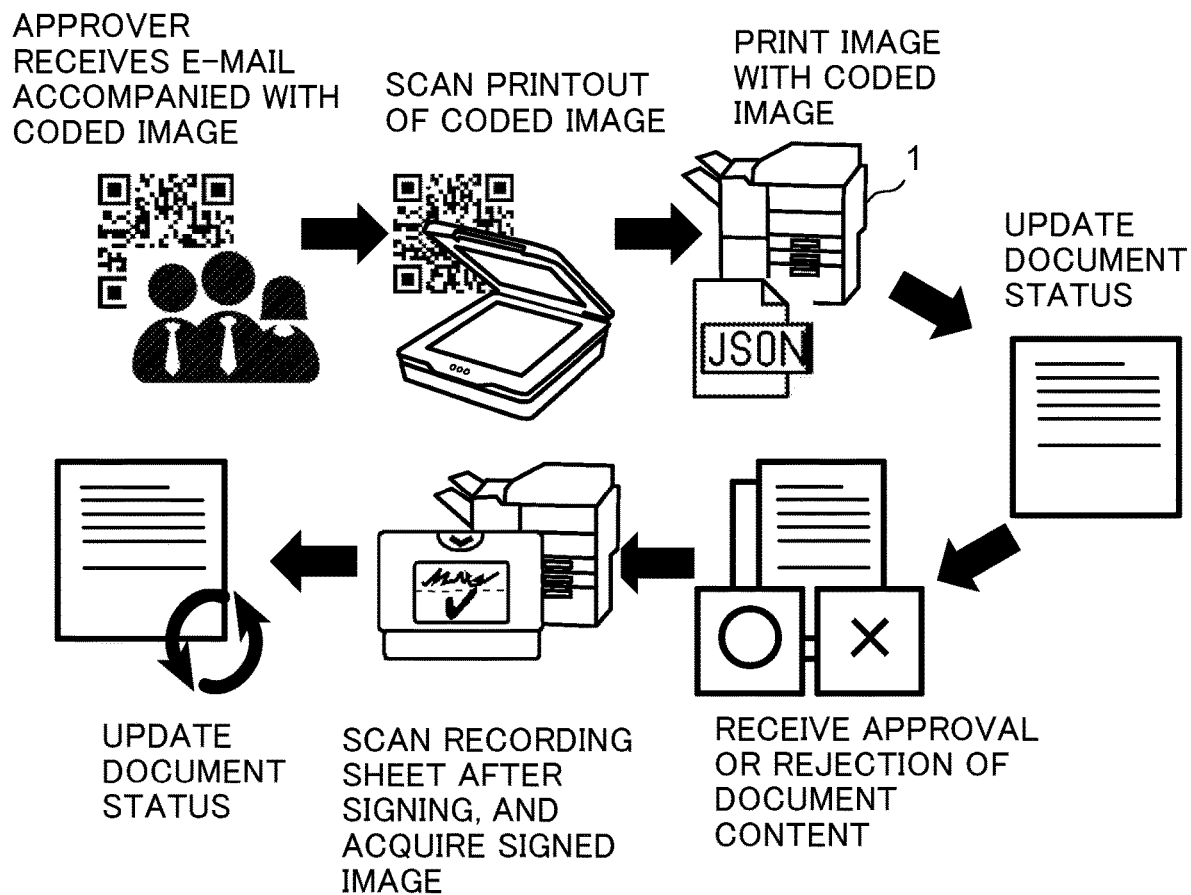
FIG. 10A is a schematic drawing showing a process through which the approver decides whether to approve the workflow related to the document from the applicant.

Upon receipt of the e-mail, the approver prints out the coded image attached to the e-mail using the image forming apparatus 1, and scans the printout of the coded image with the image reading device 5 of the image forming apparatus 1, as shown in FIG. 10A. Through such operation, the image with coded image stored in the document management server 202, in other words the image of the document for which the applicant is requesting for approval, can be printed on the recording sheet, the approver can put the signature on the printout of the image with coded image, the image of the signed recording sheet can be scanned by the image reading device 5, the image of the signed recording sheet can be acquired and stored in the document management server 202, and the status of the document can be updated to "approved". Further detail will follow hereunder.

The approver having the terminal device 201 that has received the e-mail causes the image forming apparatus 1 to print the coded image attached to the e-mail. The approver then sets the printout of the coded image on the document transport device 6 or non-illustrated contact glass, and touches a select button K8 representing "coded image scanning" displayed on the display device 473 as shown in FIG. 7A. By the touch panel function of the display device 473, a detection signal indicating that the select button K8 corresponding to the coded image scanning has been touched is outputted to the controller 100, and the controller 100 causes the image reading device 5 to start to scan the printout of the coded image, according to the detection signal (S21 in FIG. 4, see arrow Y7 in FIG. 6). Then the controller 100 causes the display device 473 to display a selection screen shown in FIG. 10B.

Figure 4:
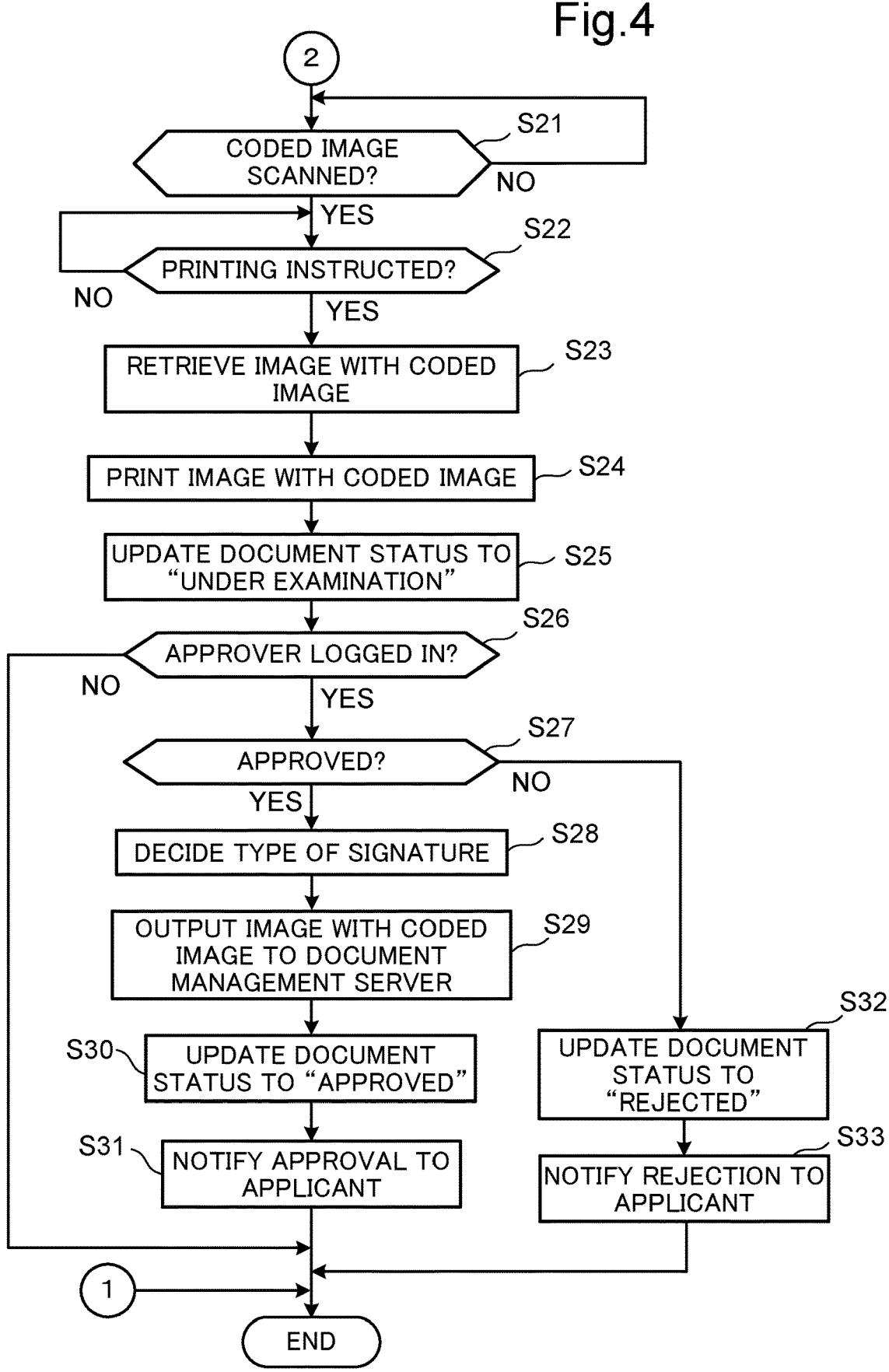
FIG. 4 is a flowchart showing the document approval management process that follows the process of FIG. 3.
Figure 5:
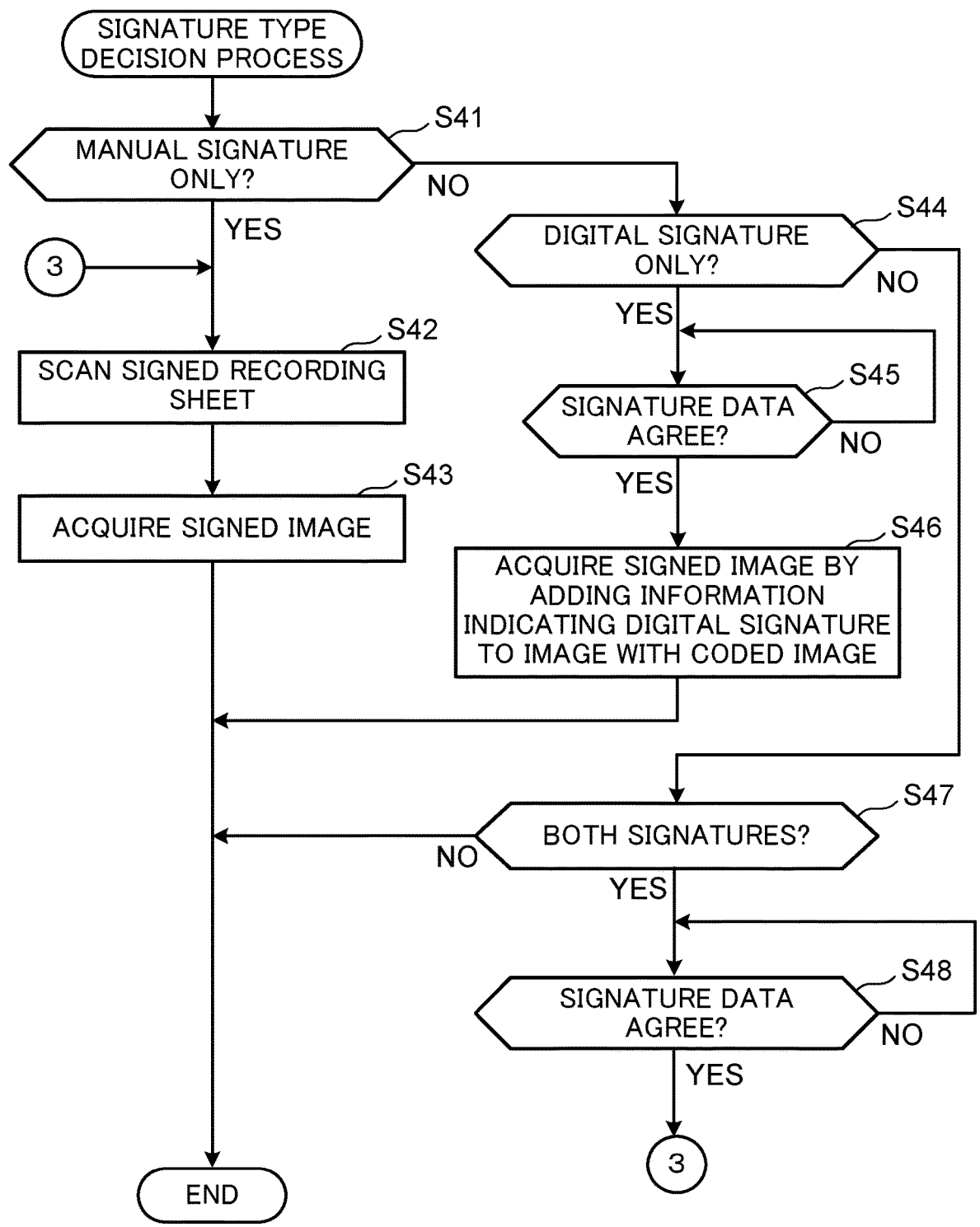
FIG. 5 is a flowchart showing a signature type decision process.
Figure 10B:
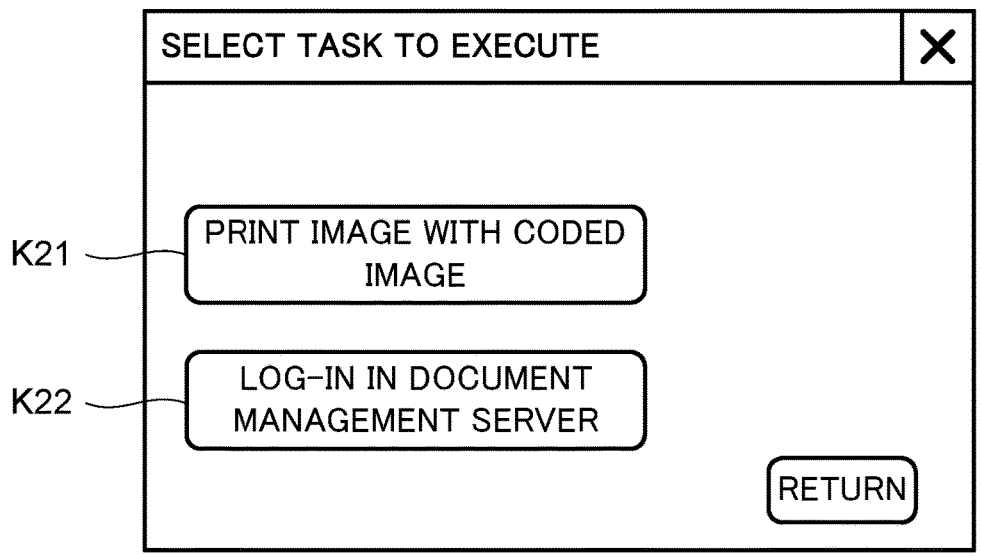

The approver touches a button K21 to instruct the printing of the image with coded image, displayed on the display device 473 as shown in FIG. 10B (YES at S22 in FIG. 4). By the touch panel function of the display device 473, a detection signal indicating that the button K21 has been touched is outputted to the controller 100, and the controller 100 instructs the reading controller 107 to read out the image with coded image. The reading controller 107 retrieves the image with coded image stored in the document management server 202 (S23, see arrow Y8 in FIG. 6). Then the image forming device 12 forms the image representing the image with coded image retrieved by the reading controller 107, on the recording sheet (S24). When the image with coded image stored in the document management server 202 is formed on the recording sheet by the image forming device 12, the status management device 202A updates the status of the document relevant to the image with coded image to "under examination" (S25).

The approver touches a button K22 for logging in in the document management server, displayed on the display device 473 as shown in FIG. 10B. By the touch panel function of the display device 473, a detection signal indicating that the button K22 has been touched is outputted to the controller 100, and the controller 100 causes the display device 473 to display an authentication information input screen for the approver as shown in FIG. 11A, according to the detection signal.

Figure 11A:
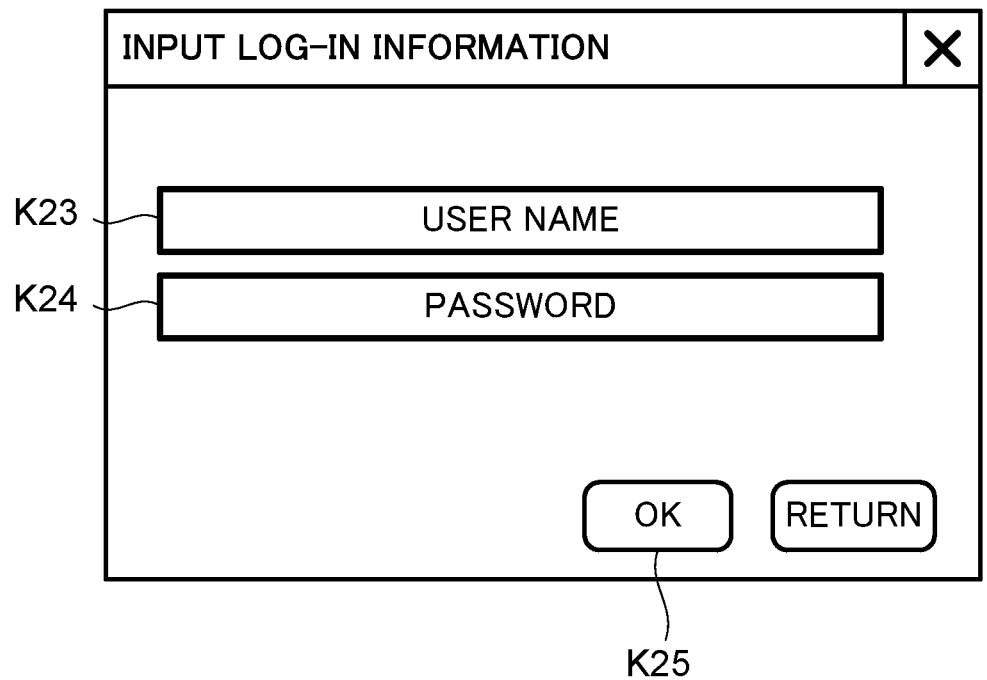
FIG. 11A is a schematic drawing showing an authentication information input screen for the approver, displayed on the display device of the image forming apparatus.

The approver selects a user name field K23 in the authentication information input screen for the approver displayed on the display device 473 as shown in FIG. 11A, and inputs the user name of the approver. The approver then selects a password field K24, and inputs the password, after which the approver touches an OK button K25. By the touch panel function of the display device 473, the information inputted through the user name field K23 and the password field K24, and a detection signal indicating that the OK button K25 has been touched, are outputted to the controller 100, and the controller 100 outputs the information inputted through the user name field K23 and the password field K24 to the authenticator 106, according to the detection signal.

The authenticator 106 receives the user name and the password inputted by the approver through the display device 473 of the operation device 47 (S26). The authenticator 106 decides whether the information inputted by the approver through the display device 473 of the operation device 47 accords with the authentication information of the user stored in advance in the authentication information storage device 92A, and decides that the authorized approver is logging in, when the accordance is confirmed (YES at S26, see arrow Y9 in FIG. 6). In the case where the accordance is not confirmed (NO at S26), the controller 100 finishes the process.

Figure 11B:
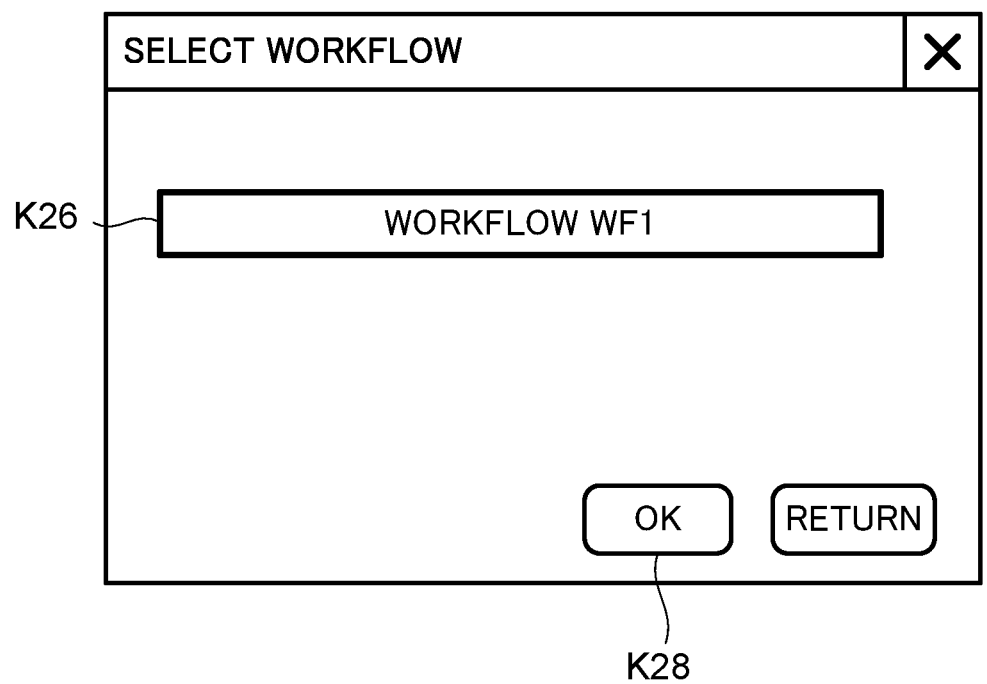
FIG. 11B is a schematic drawing showing a workflow selection screen, displayed on the display device of the image forming apparatus.
Figure 13A:
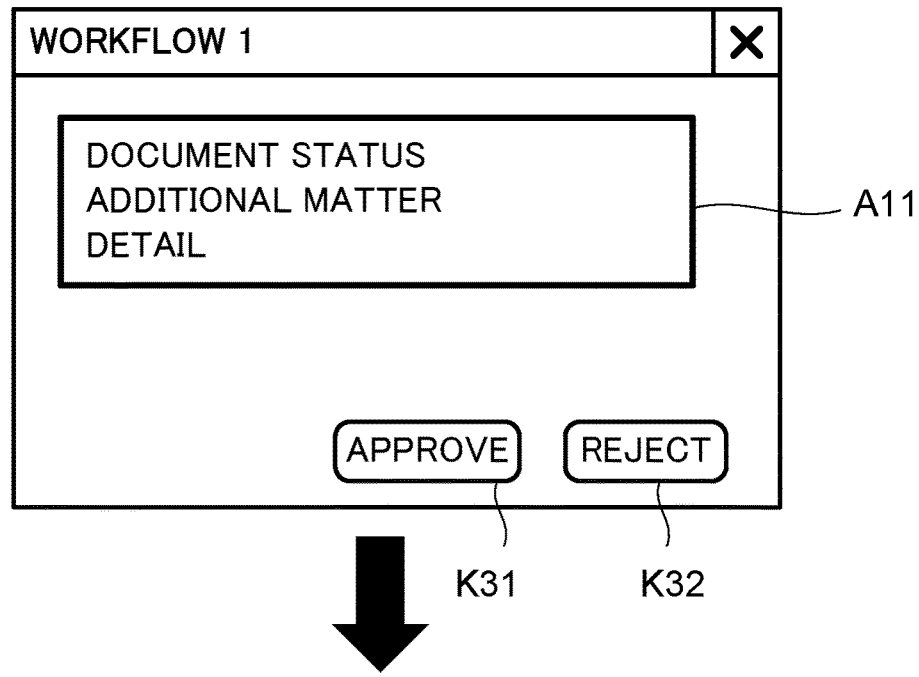
FIG. 13A is a schematic drawing showing a screen for selecting whether to approve, displayed on the display device of the image forming apparatus.

When it is decided that the authorized approver has logged in (YES at S26), the controller 100 causes the display device 473 to display a workflow selection screen as shown in FIG. 11B. The approver touches a selection field K26 representing a workflow WF1 in the workflow selection screen, displayed on the display device 473 as shown in FIG. 11B. By the touch panel function of the display device 473, a detection signal indicating that the selection field K26 has been touched is outputted to the controller 100, and the controller 100 causes the display device 473 to display an approval/rejection selection screen, as shown in FIG. 13A, according to the detection signal. Here, the document status, additional matters, and detail related to the workflow WF1 are displayed in a display field A11 of the approval/rejection selection screen shown in FIG. 13A, so that the controller 100 causes the display device 473, in response to the touching of each of the items, to display the corresponding data.

When the approver decides to approve the content of the recording sheet on which the image with coded image has been formed, in other words the content of the document for which the applicant is requesting for approval, the approver touches a select button K31 for approval, displayed on the display device 473 as shown in FIG. 13A (YES at S27). By the touch panel function of the display device 473, a detection signal indicating that the select button K31 has been touched is outputted to the controller 100, and the controller 100 executes a signature type decision process to decide the type of the approver's signature, according to the detection signal (S28).

Here, the signature type decision process will be described with reference to FIG. 5. FIG. 5 is a flowchart showing an example of the signature type decision process. The signed image acquirer 109 decides whether the coded image, acquired by the scanning of the printout of the coded image performed by the image reading device 5 at S21, represents the manual signature (S41). For example, the signed image acquirer 109 decides the signature type, depending on which of the manual signature only, the digital signature only, and both thereof is indicated by the workflow information indicating the signature type, in the workflow information included in the coded image.

Figure 12:
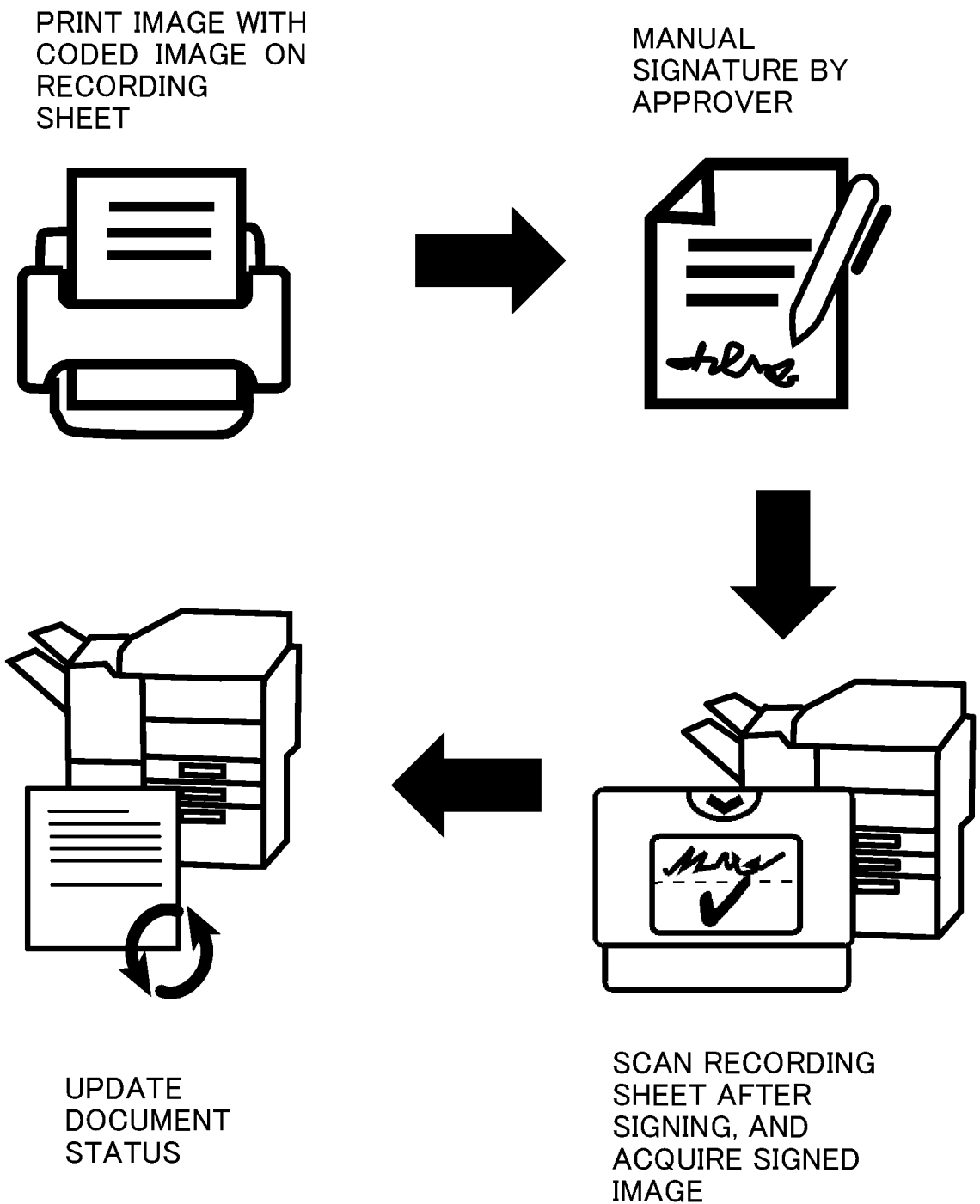
FIG. 12 is a schematic drawing showing a workflow through which the approver approves the document by a manual signature.
Figure 13B:
FIG. 13B is a schematic drawing showing the manual signature being made by the approver on a recording sheet.
Figure 13C:
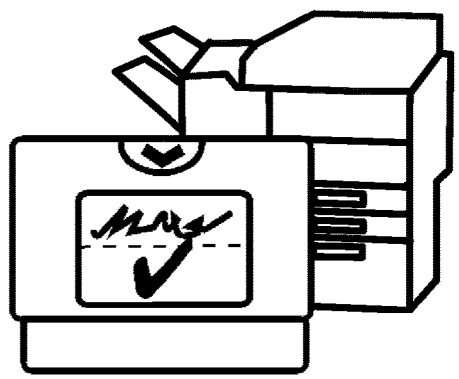
FIG. 13C is a schematic drawing showing the recording sheet with the manual signature, being scanned.

When the signed image acquirer 109 decides that the coded image represents the manual signature only (YES at S41), the controller 100 controls the image reading device 5 so as to scan the signed recording sheet (S42). More specifically, the approver puts the manual signature on the recording sheet on which the image with coded image has been formed, as shown in FIG. 13B. When the signed recording sheet is set on the document transport device 6 or the non-illustrated contact glass, the image reading device 5 starts to scan the signed recording sheet. As shown in FIG. 13C, the signed image acquirer 109 acquires the signed image, by scanning the image of the signed recording sheet with the image reading device 5 (S43). In other words, when the coded image represents the manual signature only as shown in FIG. 12, the image forming device 12 forms the image with coded image on the recording sheet, the approver puts the manual signature on the recording sheet when approving the content of the recording sheet (see arrow Y10 in FIG. 6), the signed image acquirer 109 acquires the signed image by scanning the signed recording sheet with the image reading device 5, the status of the document is updated to "approved", and the signed image is stored in the document management server 202.

Figure 14:
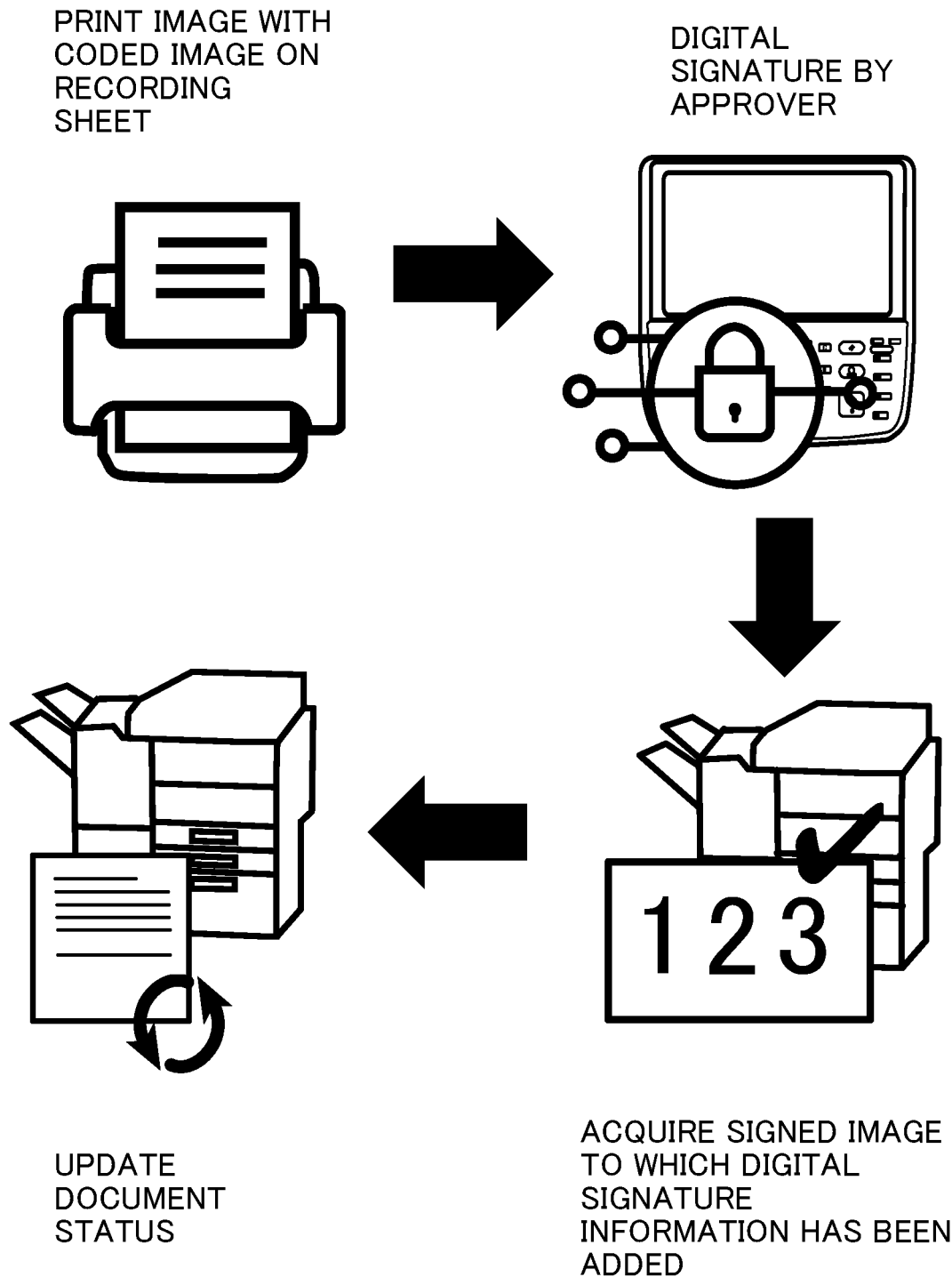
FIG. 14 is a schematic drawing showing a workflow through which the approver approves the document by a digital signature.
Figure 15A:
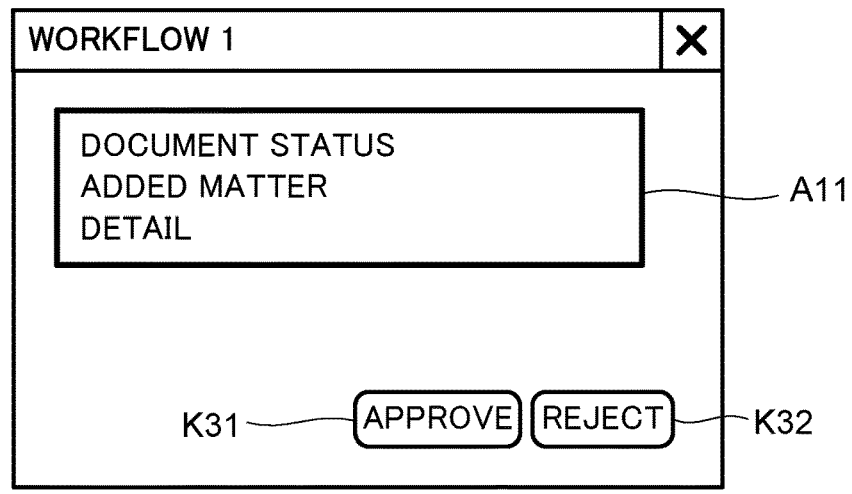
FIG. 15A is a schematic drawing showing a screen for selecting whether to approve, displayed on the display device of the image forming apparatus.
Figure 15B:
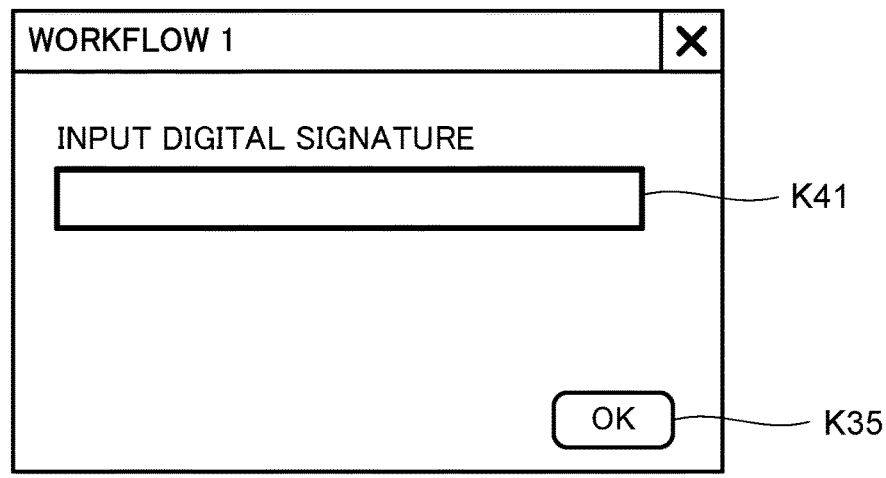
FIG. 15B is a schematic drawing showing a location where the approver inputs the digital signature for the recording sheet.

In contrast, when it is decided that the coded image is not representing the manual signature only (NO at S41), the signed image acquirer 109 decides whether the coded image represents the digital signature only (S44). When the signed image acquirer 109 decides that the coded image represents the digital signature only (YES at S44), the controller 100 decides whether the signature data (e.g., password) inputted by the approver, by touching a digital signature field K41 in a screen for inputting the digital signature displayed on the display device 473 as shown in FIG. 15B, accords with the legitimate signature data (e.g., password) stored in advance in the authentication information storage device 92A (S45). When the controller 100 confirms the accordance of the signature data (YES at S45), the signed image acquirer 109 acquires the signed image, by adding the information representing the digital signature to the image with coded image (S46). When the controller 100 confirms discordance of the signature data (NO at S45), the operation returns to S45. Here, in the case where the digital signature is decided to discord after being inputted more than a predetermined number of times, the controller 100 may finish the process. Thus, as shown in FIG. 14, when the coded image represents the digital signature only, the image forming device 12 forms the image with coded image on the recording sheet, the approver puts the digital signature on the display device 473 of the operation device 47 of the image forming apparatus 1, when approving the content of the recording sheet, the signed image acquirer 109 acquires the signed image by adding the information indicating the digital signature to the image with coded image, the status of the document is updated to "approved", and the signed image is stored in the document management server 202.

Figure 16:
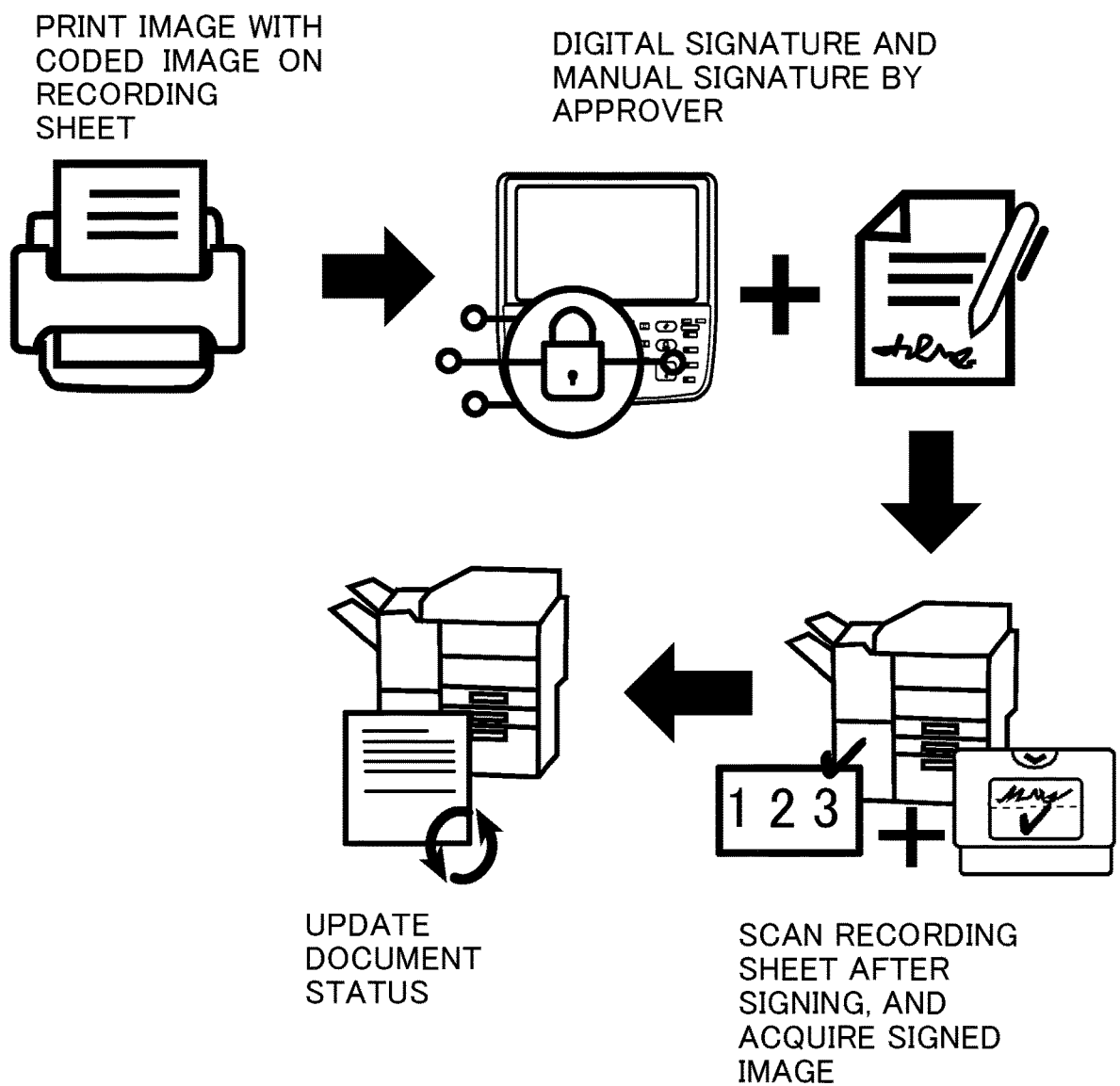
FIG. 16 is a schematic drawing showing a workflow through which the approver approves the document by both of the manual signature and the digital signature.
Figure 17D:
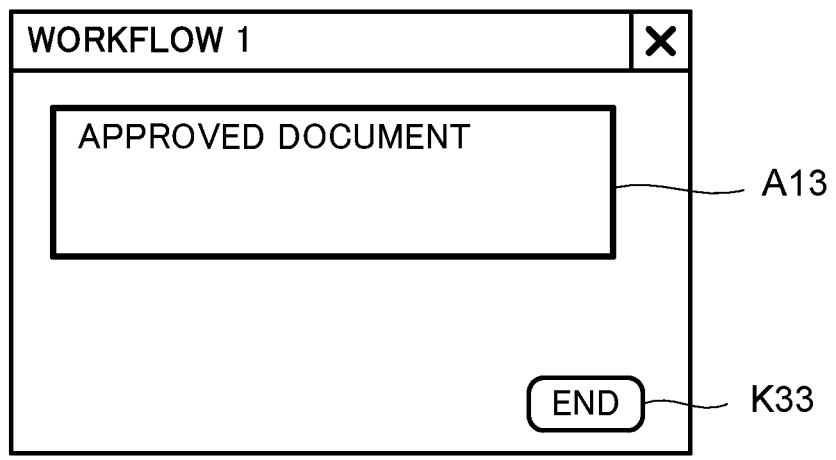
FIG. 17D is a schematic drawing showing a screen indicating that the workflow is the approved document, displayed on the display device of the image forming apparatus.

When it is decided that the coded image is not representing the digital signature only (NO at S44), the signed image acquirer 109 decides whether the coded image represents both of the manual signature and the digital signature (S47). When the signed image acquirer 109 decides that the coded image represents both of the manual signature and the digital signature (YES at S47), the controller 100 decides whether the signature data (e.g., password) inputted by the approver, by touching the digital signature field K41 in the screen for inputting the digital signature displayed on the display device 473 as shown in FIG. 17B, accords with the legitimate signature data (e.g., password) stored in advance in the authentication information storage device 92A (S48). When the controller 100 confirms the accordance of the signature data (YES at S48), the operation proceeds to S42. The controller 100 controls the image reading device 5 so as to scan the signed recording sheet (S42), and the signed image acquirer 109 acquires the signed image by scanning the signed recording sheet with the image reading device 5, as shown in FIG. 17C (S43). Thus, as shown in FIG. 16, when the coded image represents both of the manual signature and the digital signature, the image forming device 12 forms the image with coded image on the recording sheet, the approver puts, when approving the content of the recording sheet, the manual signature on the recording sheet, and also the digital signature on the display device 473 of the operation device 47 of the image forming apparatus 1, the signed image acquirer 109 acquires the signed image by scanning the signed recording sheet with the image reading device 5, the status of the document is updated to "approved", and the signed image is stored in the document management server 202.

After S43, or after S46, the controller 100 finishes the signature type decision process.

Figure 13D:
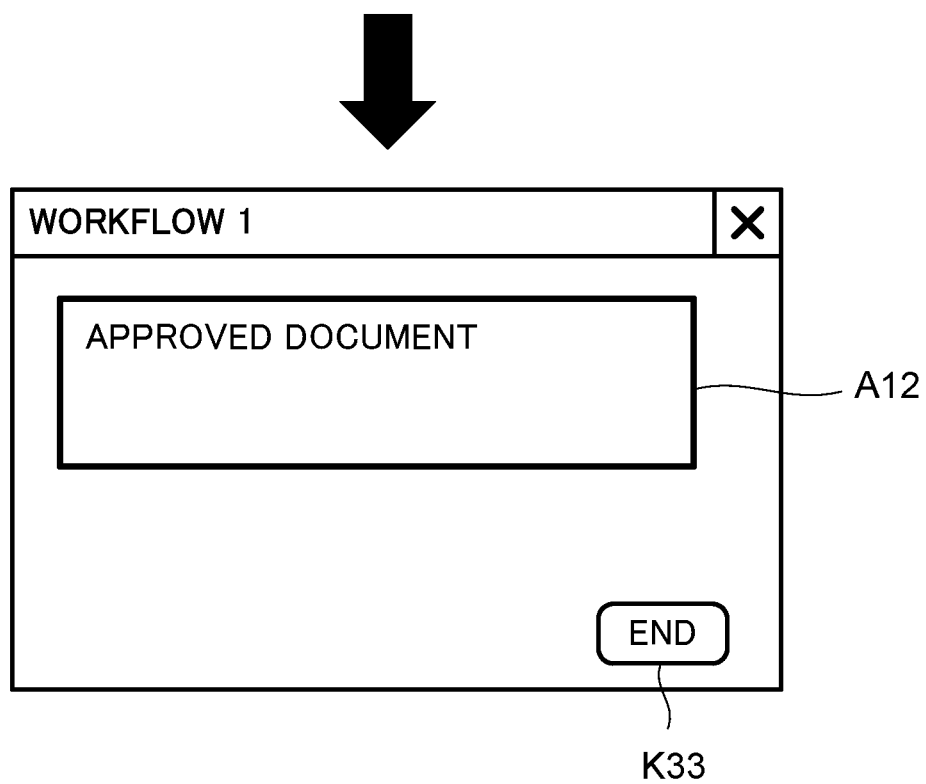
FIG. 13D is a schematic drawing showing a screen indicating that the workflow is the approved document, displayed on the display device of the image forming apparatus.
Figure 15C:
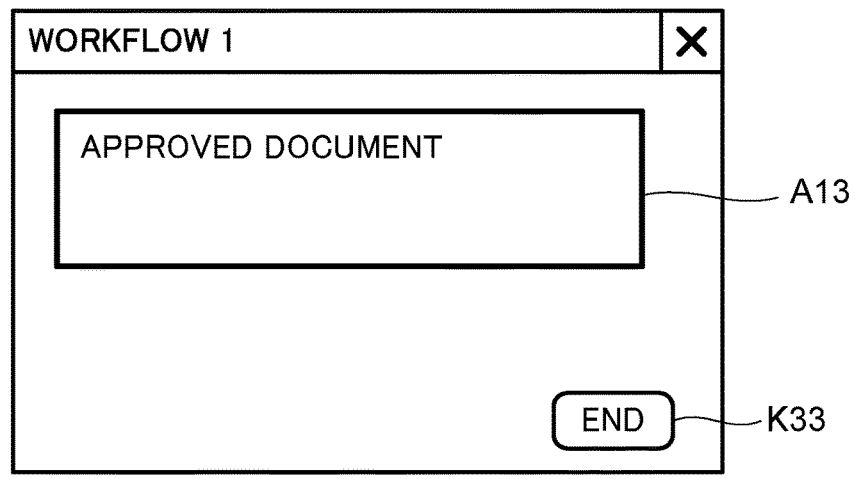
FIG. 15C is a schematic drawing showing a screen indicating that the workflow is the approved document, displayed on the display device of the image forming apparatus.

Referring back to FIG. 4, the network interface device 91 outputs the signed image acquired by the signed image acquirer 109, to the document management server 202 (S29, see arrow Y11 in FIG. 6). Then the status management device 202A updates the status of the document to "approved" (S30). The controller 100 displays the document status of "approved" in the region A12 shown in FIG. 13D, when only the manual signature is inputted, displays the document status of "approved" in the region A13 shown in FIG. 15c, when only the digital signature is inputted, and displays the document status of "approved" in the region A13 shown in FIG. 17D, when both of the manual signature and the digital signature are inputted.

When the approval receiver 108 receives the decision of approval, the e-mail communication device 95 transmits an e-mail notifying the approval, to the mail server 203 indicating the e-mail address of the applicant stored in the authentication information storage device 92A, as the destination (S31). After S31, the controller 100 finishes the process.

In contrast, when the approver rejects to approve the content of the recording sheet on which the image with coded image has been formed, in other words the content of the document for which the applicant is requesting for approval, the approver touches a select button K32 for rejection, displayed on the display device 473 as shown in FIG. 13A (NO at S27). By the touch panel function of the display device 473, a detection signal indicating that the select button K32 has been touched is outputted to the controller 100, and the controller 100 outputs an instruction to update the document status to "rejected" to the status management device 202A, according to the detection signal. Thus, when the approval receiver 108 receives the decision of rejection to the request, the status management device 202A updates the document status to "rejected" (S32). Then the e-mail communication device 95 transmits, when the approval receiver 108 receives the decision of rejection, an e-mail notifying the rejection to the request to the mail server 203, indicating the e-mail address of the applicant stored in the authentication information storage device 92A, as the destination (S33). After S33, the controller 100 finishes the process.

In the first embodiment, as described thus far, the image reading device 5 acquires the image of the document for which the applicant is requesting for approval to the approver, when the instruction to create the workflow is received from the applicant. The character recognizer 101 recognize the characters in the predetermined region in the image acquired by the image reading device 5. The workflow information acquirer 102 acquires the workflow information including the e-mail address of the approver, out of the character information recognized by the character recognizer 101. The coded image creator 103 creates the coded image, by encoding the workflow information acquired by the workflow information acquirer 102, and image identification information for identifying the image acquired by the image reading device 5. The generator 104 generates the image with coded image, by adding the coded image created by the coded image creator 103 to the image acquired by the image reading device 5. The workflow creator 105 creates the workflow, by associating the image with coded image generated by the generator 104 with the workflow information acquired by the workflow information acquirer 102. The network interface device 91 outputs the image with coded image of the workflow created by the workflow creator 105, to the document management server 202. The e-mail communication device 95 transmits the e-mail accompanied with the coded image to the mail server 203, indicating the e-mail address of the approver included in the workflow information as the destination. The authenticator 106 decides whether the information inputted by the approver through the operation device 47 upon receipt of the e-mail accords with the authentication information of the approver stored in advance in the authentication information storage device 92A, and decides that the approver is logging in, when the accordance is confirmed. The reading controller 107 retrieves the image with coded image stored in the document management server 202, when the coded image attached to the received e-mail is read, or upon receipt of an instruction to print the image with coded image, after the authenticator 106 decides that the approver has logged in. The image forming device 12 forms the image representing the image with coded image retrieved by the reading controller 107, on the recording sheet. The approval receiver 108 receives the decision of approval or rejection with respect to the content of the recording sheet on which the image with coded image has been formed by the image forming device 12, when the authenticator 106 decides that the approver has logged in. The signed image acquirer 109 acquires the signed image, which is the image of the recording sheet on which the image with coded image has been formed by the image forming device 12, and signed by the approver, when the approval receiver 108 receives the decision of approval. The network interface device 91 outputs the signed image acquired by the signed image acquirer 109, to the document management server 202. The mentioned arrangement enables the workflow for automatizing the document approval process to be created. Further, since the image with coded image, and the signed image (image with coded image, to which the approver's signature is added) are stored in the document management server 202, the user (applicant or approver) can confirm those images, to thereby recognize the history of the workflow.

With the existing information processing apparatus management system according to the foregoing background art, the information management computer merely stores the management history (e.g., request from the individual terminal to operate the target computer, the approval result of the request, and the execution result provided by the target computer) in the database in the form of an operation result report, when confirming whether the approver computer approves the operation request from the individual terminal, thereby managing the target computer, and is not designed to serve as a workflow system for managing the document to be approved. Therefore, the existing information processing apparatus management system is unable to create the workflow for automatizing the document approval process.

In contrast, the system according to the foregoing embodiment enables the workflow for automatizing the document approval process to be created.

Further, the result of approval or rejection, with respect to the document for which the approval has been requested, is notified to the applicant, and therefore the applicant can promptly and accurately recognize the result of approval or rejection. In other words, the applicant can promptly and accurately recognize the progress of the workflow.

Figure 18:
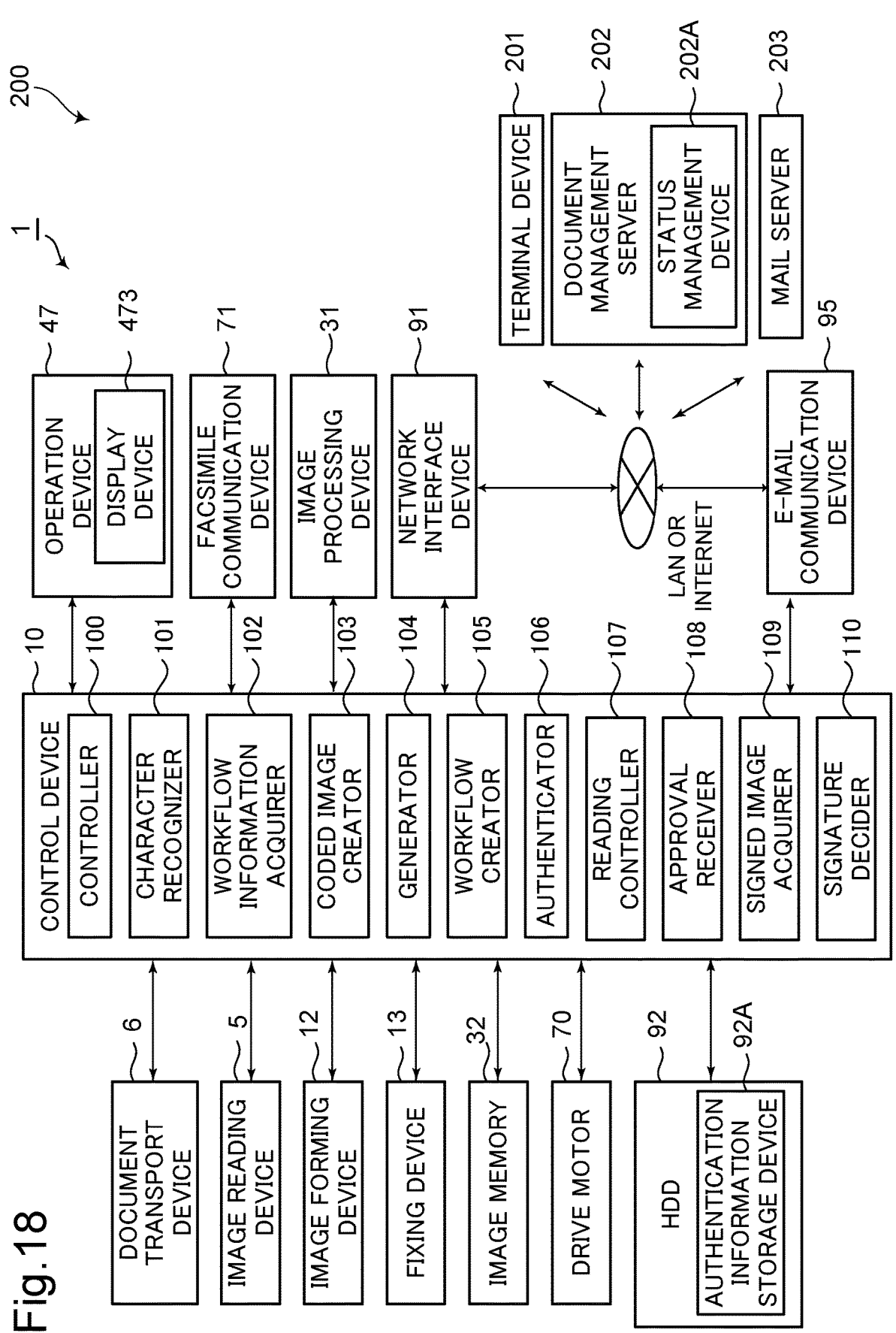
FIG. 18 is a functional block diagram showing an essential internal configuration of an image forming apparatus and a document management server, constituting a document approval management system according to a second embodiment.

Referring now to FIG. 18, the document approval management system 200 according to a second embodiment will be described hereunder. FIG. 18 is a functional block diagram showing an essential internal configuration of an image forming apparatus and a document management server, constituting the document approval management system according to the second embodiment.

The second embodiment is different from the first embodiment in further including a signature decider 110, and therefore the signature decider 110 will be primarily described. The same components as those shown in FIG. 2 are given the same numeral, and the description of such components will not be repeated.

The signature decider 110 decides whether the manual signature, manually written on the recording sheet on which the image with coded image has been formed, accords with the manual signature of the approver stored in advance in the authentication information storage device 92A.

(1) When the coded image indicates the manual signature as the signature type of the approver, the signed image acquirer 109 acquires, as the signed image, the image of the signed recording sheet, including the manual signature of the approver written on the recording sheet on which the image with coded image has been formed, when the signature decider 110 confirms the accordance, but causes the approval receiver 108 to change the approval to the rejection, instead of acquiring the signed image, when the signature decider 110 confirms discordance.

(2) When the coded image indicates the digital signature as the signature type of the approver, the signed image acquirer 109 acquires, as the signed image, the image with coded image to which the information representing the digital signature has been added, when the signature data (e.g., password) inputted by the approver through the operation device 47 accords with the legitimate signature data (e.g., password) stored in advance in the authentication information storage device 92A, but causes the approval receiver 108 to change the approval to the rejection, instead of acquiring the signed image, when the signature decider 110 confirms discordance from the legitimate signature data.

(3) When the coded image indicates both of the manual signature and the digital signature as the signature type of the approver, the signed image acquirer 109 acquires, as the signed image, the image of the signed recording sheet, including the manual signature of the approver written on the recording sheet on which the image with coded image has been formed, when the signature data inputted by the approver through the operation device 47 accords with the legitimate signature data (e.g., password) stored in advance in the authentication information storage device 92A, and the signature decider 110 confirms the accordance, but causes the approval receiver 108 to change the approval to the rejection, instead of acquiring the signed image, when the signature decider 110 confirms discordance, or when discordance from the legitimate signature data is confirmed.

With the configuration according to the second embodiment, it can be confirmed that the manual signature manually written on the recording sheet accords with the manual signature of the approver stored in advance, and therefore the security of the workflow can be further improved.

Although the image reading device 5 acquires the coded image by scanning the printout of the coded image, at S21 of FIG. 4 in the foregoing embodiments, different arrangements may be adopted. For example, the coded image attached to the e-mail received by the terminal device 201 of the approver may be transmitted to the image forming apparatus 1, to thereby acquire the coded image. Alternatively, the approver may log in in the document management server, to acquire the image with coded image.

Further, although the generator 104 generates the image with coded image, by adding the coded image created by the coded image creator 103 to the image acquired by the image reading device 5, in the foregoing embodiments, different arrangements may be adopted. For example, the generator 104 may generate an image in which the coded image created by the coded image creator 103 is associated with the image acquired by the image reading device 5, and utilize such an image as the image with coded image.

The configurations and arrangements according to the foregoing embodiments, described with reference to FIG. 1 to FIG. 18, are merely exemplary, and in no way intended to limit the disclosure to those configurations and arrangements.

While the present disclosure has been described in detail with reference to the embodiments thereof it would be apparent to those skilled in the art the various changes and modifications may be made therein within the scope defined by the appended claims.

What is claimed is:

1. A document approval management system comprising an image forming apparatus, a document management server, and a mail server connected to each other via a network, wherein the image forming apparatus includes:
an operation device;
an image acquisition device that acquires an image of a document for which an applicant requests for approval to an approver, when the operation device receives an instruction to create a workflow from the applicant;
a control device including a processor, and configured to act, when the processor executes a document management control program, as:
a character recognizer that recognizes a character in a predetermined region included in the image acquired by the image acquisition device;
a workflow information acquirer that acquires workflow information including an e-mail address of the approver, from the character information recognized by the character recognizer;
a coded image creator that creates a coded image by encoding the workflow information acquired by the workflow information acquirer, and image identification information for identifying the image acquired by the image acquisition device;
a generator that generates an image with coded image, by adding the coded image created by the coded image creator to the image acquired by the image acquisition device; and
a workflow creator that creates a workflow by associating the image with coded image generated by the generator with the workflow information acquired by the workflow information acquirer;
an output device that outputs the image with coded image of the workflow created by the workflow creator, to the document management server;
an e-mail transmission device that transmits an e-mail accompanied with the coded image to the mail server, indicating the e-mail address of the approver including in the workflow information as destination; and
an authentication information storage device that contains authentication information stored in advance,
the control device being further configured to act, when the processor executes the document management control program, as:
an authenticator that decides whether information inputted by the approver through the operation device upon receipt of the e-mail accords with the authentication information stored in advance in the authentication information storage device, and decides that the approver is logging in, upon confirming the accordance; and
a reading controller that retrieves the image with coded image stored in the document management server, when the coded image attached to the e-mail is read, or upon receipt of an instruction to print the image with coded image after the authenticator decides that the approver has logged in, the image forming apparatus further including an image forming device that forms an image representing the image with coded image retrieved by the reading controller, on a recording sheet, the control device being further configured to act, when the processor executes the document management control program, as:

an approval receiver that receives a decision of approval or rejection with respect to a content of the recording sheet on which the image with coded image has been formed by the image forming device, when the authenticator decides that the approver has logged in; and a signed image acquirer that acquires a signed image, created by the approver by putting a signature on the recording sheet on which the image with coded image has been formed by the image forming device, when the approval receiver receives the decision of approval, and the output device outputs the signed image acquired by the signed image acquirer, to the document management server.

2. The document approval management system according to claim 1, wherein the e-mail transmission device transmits, when the approval receiver receives the decision of approval or rejection, an e-mail notifying the approval or rejection to the mail server, indicating an e-mail address of the applicant stored in the authentication information storage device as destination.

3. The document approval management system according to claim 1, wherein the document management server includes a status management device that manages a status of the document, and the status management device updates, when the image with coded image stored in the document management server is formed on the recording sheet by the image forming device, the status of the document relevant to the image with coded image to "under examination", updates the document status to "approved", when the approval receiver receives the decision of approval, and updates the document status to "rejected", when the approval receiver receives the decision of rejection.

4. The document approval management system according to claim 1, wherein the authenticator decides whether information inputted through the operation device accords with authentication information stored in advance in the authentication information storage device, and decides that an authorized applicant is logging in, when the accordance is confirmed, and the workflow creator creates a workflow by associating the image with coded image generated by the generator with the workflow information acquired by the workflow information acquirer, when the authenticator decides that the authorized applicant has logged in, and the instruction to create the workflow is received from the authorized applicant.

5. The document approval management system according to claim 1, wherein the control device is further configured to act, when the processor executes the document management control program, as a controller that designates, when the image acquisition device acquires an image of the document to be approved, a region including an e-mail address of the approver in the image acquired by the image acquisition device, as a character recognition region to be recognized by the character recognizer.

6. The document approval management system according to claim 1, wherein the workflow information acquirer acquires the workflow information indicating one of a manual signature, a digital signature, and both thereof, as a signature type of the approver, from the character information recognized by the character recognizer, and (1) the signed image acquirer acquires the image acquired by the image acquisition device as the signed image, when the coded image indicates the manual signature as the signature type of the approver, (2) when the coded image indicates the digital signature as the signature type of the approver, the signed image acquirer acquires, as the signed image, the image with coded image to which information representing the digital signature has been added, when it is decided that the signature data inputted by the approver through the operation device accords with a legitimate signature data stored in advance in the authentication information storage device, and (3) when the coded image indicates both of the manual signature and the digital signature as the signature type of the approver, the signed image acquirer acquires, as the signed image, the image acquired by the image acquisition device to which the information representing the digital signature has been added, when it is decided that the signature data inputted by the approver through the operation device accords with the legitimate signature data stored in advance in the authentication information storage device.

7. The document approval management system according to claim 6, wherein the control device is further configured to act, when the processor executes the document management control program, as a signature decider that decides whether the manual signature, manually written on the recording sheet on which the image with coded image has been formed, accords with the manual signature of the approver stored in advance in the authentication information storage device, and (1) when the coded image indicates the manual signature as the signature type of the approver, the signed image acquirer acquires the image acquired by the image acquisition device as the signed image, when the signature decider confirms the accordance, but causes the approval receiver to change the approval to the rejection, instead of acquiring the signed image, when the signature decider confirms discordance, (2) when the coded image indicates the digital signature as the signature type of the approver, the signed image acquirer acquires, as the signed image, the image with coded image to which the information representing the digital signature has been added, when the signature data inputted by the approver through the operation device accords with the legitimate signature data stored in advance in the authentication information storage device, but causes the approval receiver to change the approval to the rejection, instead of acquiring the signed image, when discordance from the legitimate signature data is confirmed, and (3) when the coded image indicates both of the manual signature and the digital signature as the signature type of the approver, the signed image acquirer acquires, as the signed image, the image with coded image to which the information representing the digital signature has been added, when the signature data inputted by the approver through the operation device accords with the legitimate signature data stored in advance in the authentication information storage device, and the signature decider confirms the accordance, but causes the approval receiver to change the approval to the rejection, instead of acquiring the signed image, when the signature decider confirms discordance, or when discordance from the legitimate signature data is confirmed.

8. The document approval management system according to claim 6,
wherein the control device is further configured to act, when the processor executes the document management control program, as a controller that designates a region including a signature field in the image acquired by the image acquisition device, as a character recognition region to be recognized by the character recognizer, when only the manual signature, or both of the manual signature and the digital signature are selected as the signature type, but does not designate the region including the signature field in the image acquired by the image acquisition device, as the character recognition region to be recognized by the character recognizer, when only the digital signature is selected.

* * * * *